US006539712B2

(12) United States Patent
Konishi et al.

(10) Patent No.: US 6,539,712 B2
(45) Date of Patent: Apr. 1, 2003

(54) HYDRAULIC DRIVE UNIT

(75) Inventors: Sigetaka Konishi, Ebina (JP); Kenji Suzuki, Sagamihara (JP); Hideki Sekiguchi, Sagamihara (JP); Takao Muto, Tama (JP)

(73) Assignee: Kayaba Kogyo Kabushiki Kaisha (JP)

( * ) Notice: Subject to any disclaimer, the term of this patent is extended or adjusted under 35 U.S.C. 154(b) by 0 days.

(21) Appl. No.: 09/748,452

(22) Filed: Dec. 26, 2000

(65) Prior Publication Data

US 2002/0092417 A1 Jul. 18, 2002

(30) Foreign Application Priority Data

Dec. 27, 1999 (JP) .......................................... 11-369905
Jul. 31, 2000 (JP) ...................................... 2000-230445
Jul. 31, 2000 (JP) ...................................... 2000-230446

(51) Int. Cl.[7] ............................................... F16D 31/02
(52) U.S. Cl. ............................. 60/460; 60/468; 91/445
(58) Field of Search .......................... 60/460, 466, 468; 91/445, 447

(56) References Cited

U.S. PATENT DOCUMENTS 4,557,109 A * 12/1985 Nagahara et al. ............. 60/436

FOREIGN PATENT DOCUMENTS

JP 57479 * 5/1977 .................. 91/447
JP 58-128506 * 8/1983 .................. 91/447
JP 58-191402 12/1983

* cited by examiner

*Primary Examiner*—F. Daniel Lopez
(74) *Attorney, Agent, or Firm*—McGlew and Tuttle, P.C.

(57) ABSTRACT

A hydraulic drive unit is disclosed which can prevent the occurrence of cavitation at the time of turning OFF of a hydraulic motor without greatly modifying the circuit configuration and the entire system and which, as a result, can improve the deceleration feeling of the hydraulic motor and prevent the occurrence of a low noise. More specifically, a hydraulic drive unit is disclosed which comprises a pair of main circuits (1), (2) each connecting an oil pressure source with a hydraulic motor (M); a counter-balancing valve (3) disposed halfway of the main circuits (1), (2) so as to be capable of being changed over from one position to another, said counter-balancing valve (3) being provided with a pair of discharge passages (10), (11) and a pair of return passages (12*a*), (12*b*), both of which are adapted to be opened and closed for the main circuits (1), (2), a pair of first check valves (13), (14) disposed halfway of the discharge passages (10), (11), a pair of orifices (28), (29) disposed halfway of the return passages (12*a*), (12*b*); and a pair of branch passages (21), (22) which are connected to the discharge passages (10), (11) on upstream sides of the first check valves (13), (14) and selectively connected to the by-pass circuit(27); return circuits (23), (24) each connected to the main circuits (1), (2) in a position therebetween; a pair of second check valves (25), (26) disposed halfway of the return circuits (23), (24); and a by-pass circuit (27) connected to the return circuits (23), (24) in a position between the second check valves (25), (26).

2 Claims, 17 Drawing Sheets

HYDRAULIC DRIVE UNIT

BACKGROUND OF THE INVENTION

The present invention relates to a hydraulic drive unit for driving a hydraulic motor which is utilized as a traveling device in a construction machine. Particularly, the invention is concerned with a hydraulic drive unit capable of preventing the occurrence of cavitation while a hydraulic motor is OFF.

As this type of a hydraulic drive unit there is known, for example, such a hydraulic circuit as shown in FIG. 17.

In this hydraulic circuit, a hydraulic motor M is connected to an oil pressure source comprising a pump and a tank via a pair of main circuits 1 and 2, a counter-balancing valve 3 disposed halfway of the main circuits 1 and 2, and ports P1 and P2. Further, a return circuit 64 is disposed between the two main circuits 1 and 2, a pair of check valves 5 and 6 are disposed halfway of the return circuit 64 so as to be capable of being opened and closed, and a low pressure circuit 7 is connected to the return circuit 64 at a position between the two check valves 5 and 6. A leakage circuit from the motor M is connected to the low pressure circuit 7, which in turn is connected to the tank side via tank ports T1 and T2.

For rotating the hydraulic motor M in a forward direction for example, the pump port P1 is connected to the pump side and the other pump port P2 connected to the tank side through a change-over valve (not shown), allowing an oil pressure to be fed from the pump port P1. At this time, with a pilot pressure, the counter-balancing valve 3 changes over to its left-hand position, whereby an oil pressure is fed from the main circuit 1 to the hydraulic motor M, causing the motor to rotate in the forward direction. Return oil from the hydraulic motor M is returned to the tank side via the other main circuit 2, counter-balancing valve 3, and pump port P2.

When the change-over valve is changed over to its neutral position, the pilot pressure is extinguished, the counter-balancing valve 3 returns to its neutral position, and hence the supply of the pressure oil is stopped, with the result that the hydraulic motor M turns OFF.

However, at the beginning of turning OFF of the hydraulic motor M the motor rotates by the force of inertia. The hydraulic motor M sucks in oil in the main circuit 1 and discharges the oil into the other main circuit 2, that is, performs a so-called pumping operation. Thus, the main circuit 1 becomes negative in pressure, the hydraulic motor M sucks in air in the main circuit 1, and cavitation occurs, thereby generating a low-noise for the hydraulic motor M. Therefore, for preventing the occurrence of cavitation caused by vacuum action, oil is sucked in from the tank side by means of the low pressure circuit 7 and a hydraulic operating oil is fed to the hydraulic motor M via the return circuit 64, check valve 5 and main circuit 1.

In the above conventional hydraulic drive unit, when the hydraulic motor turns OFF, oil is supplied from the low pressure circuit 7 for preventing the occurrence of cavitation. In this connection, the low pressure circuit 7 is required to have a pressure and a flow rate both sufficient to effect the supply of oil.

However, since the low pressure circuit is a drain line, it is impossible to set its pressure so high, and for ensuring the required oil pressure and flow rate it is necessary to alter not only the hydraulic motor but also the circuit and the entire system used. However, when the hydraulic drive unit is used for a traveling device in a small-sized construction machine for example, it is impossible to alter even the circuit and system used in the machine body and it is the present situation that the improvement in deceleration feeling of the hydraulic motor and the prevention of low-noise occurrence due to cavitation are not effected to a satisfactory extent.

SUMMARY OF THE INVENTION

Accordingly, it is an object of the present invention to provide a hydraulic drive unit which, without the need of greatly altering the circuit configuration and the entire system, can prevent the occurrence of cavitation when a hydraulic motor is OFF and as a consequence thereof can also attain the improvement in the deceleration feeling of the hydraulic motor and the prevention of low-noise occurrence.

For achieving the above-mentioned object, according to one means adopted in the present invention there is provided a hydraulic drive unit comprising a pair of main circuits each connecting an oil pressure source with a hydraulic motor; a counter-balancing valve disposed halfway of the main circuits so as to be capable of being changed over from one position to another, said counter-balancing valve being provided with a pair of discharge passages and a pair of return passages, both of which are adapted to be opened and closed for the main circuits, a pair of first check valves disposed halfway of the discharge passages, a pair of orifices disposed halfway of the return passages, and a pair of branch passages which are connected to the discharge passages on upstream sides of the first check valves and selectively connected to the by-pass circuit; return circuits each connected to the main circuits in a position therebetween; a pair of second check valves disposed halfway of the return circuits; and a by-pass circuit connected to the return circuits in a position between the second check valves.

According to a still further means adopted in the present invention there is provided a hydraulic drive unit comprising a pair of main circuits each connecting an oil pressure source with a hydraulic motor and having first main circuits and second main circuits which are in parallel with each other; first check valves disposed halfway of the first main circuits; a counter-balancing valve disposed halfway of the second main circuits so as to be capable of being changed over from one position to another, said counter-balancing valve being provided with a pair of branch passages selectively opening and closing the second main circuits for the first by-pass circuit, a pair of return passages opened and closed for the second main circuits, and a pair of orifices disposed halfway of the return passages; return circuits each connected to the main circuits in a position there between; a pair of second check valves disposed halfway of the return circuits; and a first by-pass circuit connected to the return circuits in a position between the second check valves.

According to a still further means adopted in the present invention there is provided a hydraulic drive unit comprising a pair of main circuits each connecting an oil pressure source with a hydraulic motor and having first main circuits and second main circuits which are in parallel with each other; first check valves disposed halfway of the first main circuits; a counter-balancing valve disposed halfway of the second main circuits so as to be capable of being changed over from one position to another, said counter-balancing valve being provided with a pair of return passages opened and closed for the second main circuits, and a pair of orifices disposed halfway of the return passages; return circuits each connected to the main circuits in a position therebetween; a pair of second check valves disposed halfway of the return circuits; a first by-pass circuit connected to the return circuits in a position between the second check valves; second by-pass circuits connected to the main circuits in a position therebetween, in parallel with the return circuits; and a change-over valve disposed halfway of the second by-pass circuits and at the same time of changing-over thereof, selectively opening and closing the first by-pass circuit to one of the second by-pass circuits.

According to a still further means adopted in the present invention there is provided a hydraulic drive unit comprising a pair of main circuits each connecting an oil pressure source with a hydraulic motor; a counter-balancing valve disposed halfway of the main circuits so as to be capable of being changed over from one position to another, said counter-balancing valve being provided with a pair of discharge passages and a pair of return passages, both of which are adapted to be opened and closed for the main circuits, a pair of first check valves disposed halfway of the discharge passages, a pair of orifices disposed halfway of the return passages, and a pair of branch passages which are connected to the discharge passages on upstream sides of the first check valves and are selectively connected to the by-pass circuit; return circuits each connected to the main circuits in a position therebetween; a high pressure selection valve disposed halfway of the return circuits so as to be capable of being changed over from one position to another; and a by-pass circuit connected to the return circuits on a downstream side of the high pressure valve so as to be capable of being changed over from one position to another.

Preferably, auxiliary passages which communicate with a brake cylinder-side circuit so as to be capable of being opened and closed are connected to the branch passages of the counter-balancing valve.

Preferably, the counter-balancing valve consists of a spool type valve body inserted slidably into a valve hole of a valve body, said valve hole being provided with a land groove having a suitable width which opens and closes the by-pass circuit and the branch circuits in accordance with a stroke of the counter-balancing valve.

DETAILED DESCRIPTION OF THE PREFERRED EMBODIMENTS

Embodiments of the present invention will be described hereinafter with reference to the accompanying drawings.

Figure 1:
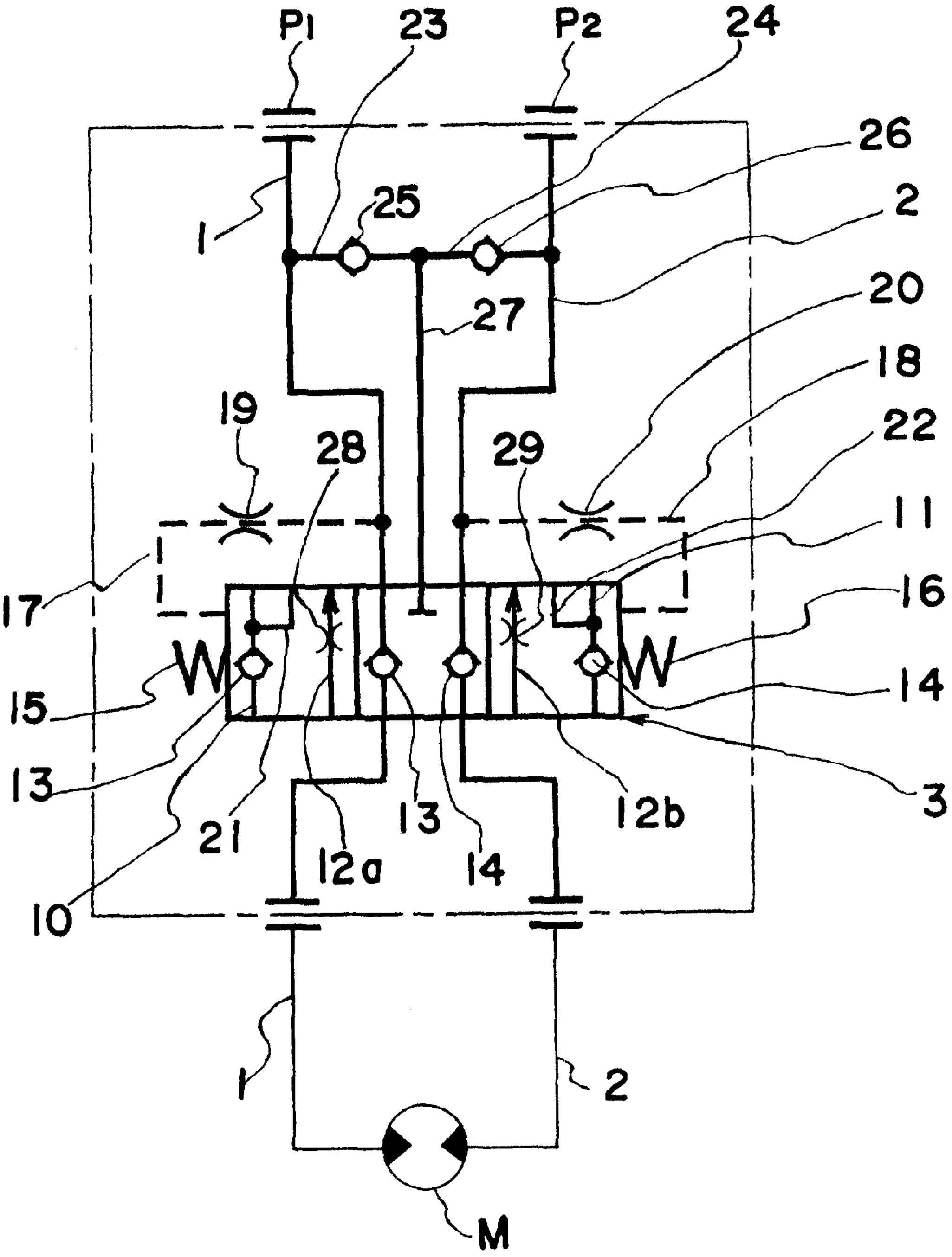
FIG. 1 is a circuit diagram for a hydraulic drive unit according to an embodiment of the present invention.
Figure 2:
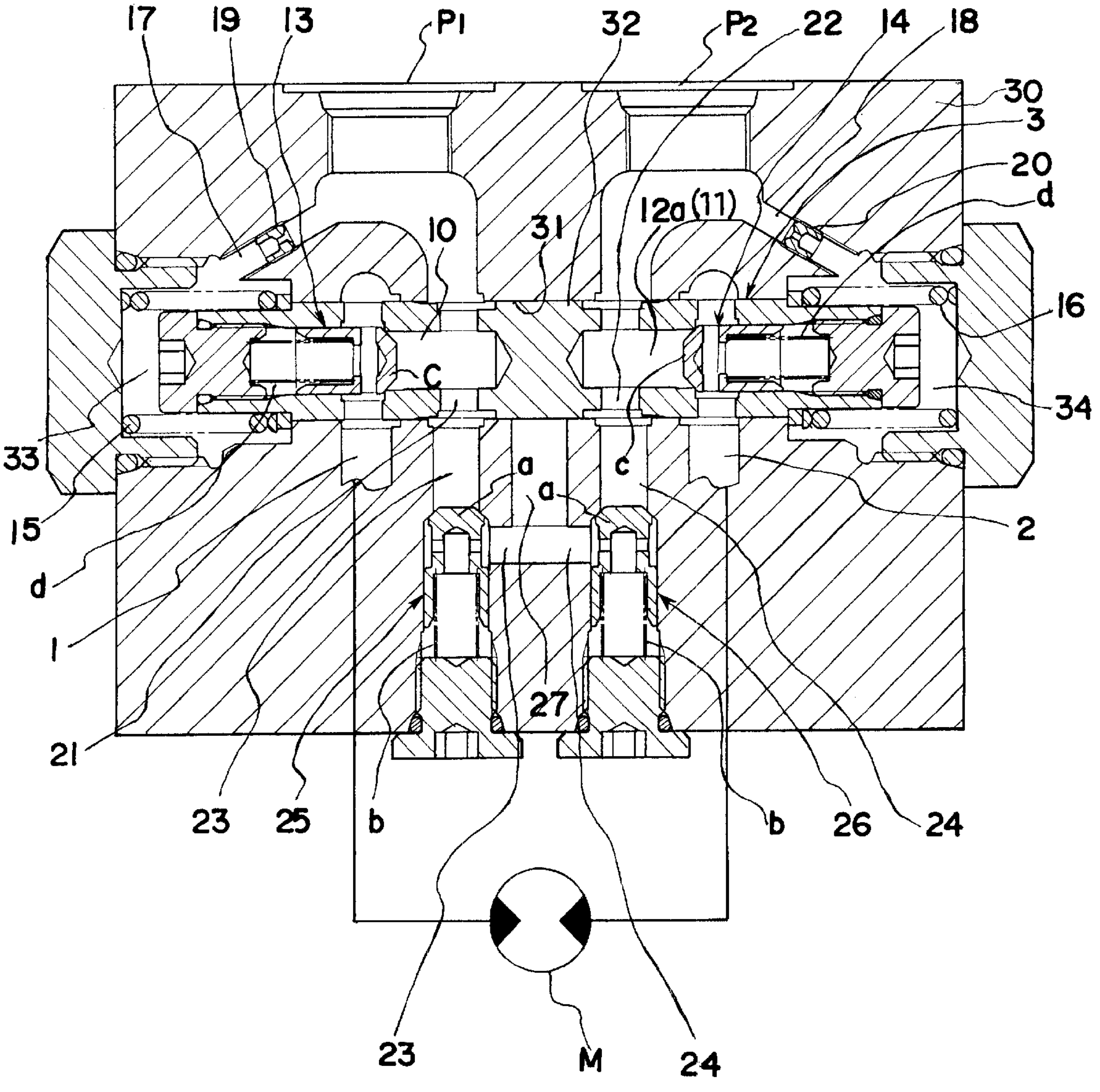
FIG. 2 is a front view in vertical section of a hydraulic drive unit based on the circuit illustrated in FIG. 1.
Figure 3:
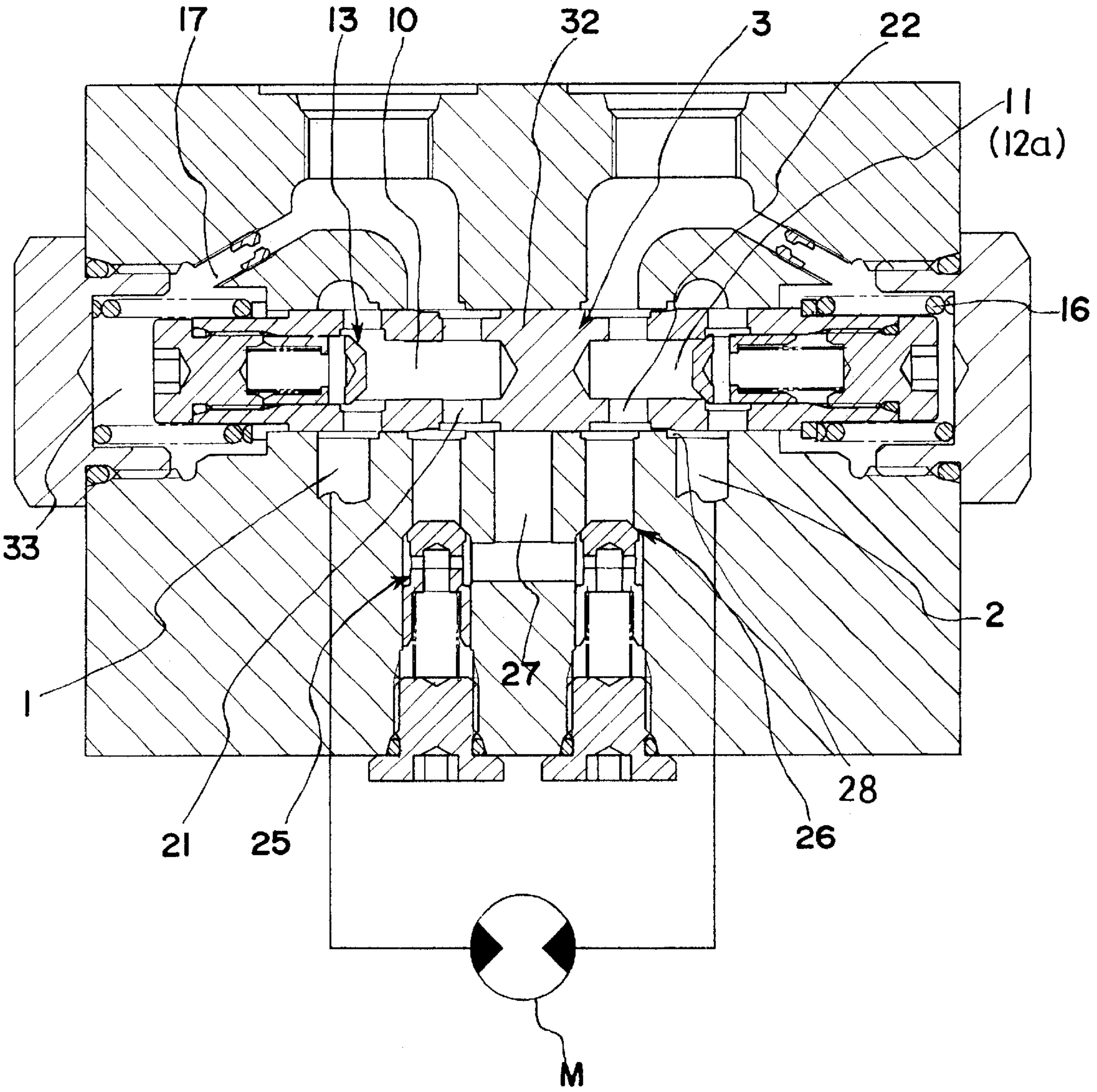
FIG. 3 is a front view in vertical section showing an operating state of the hydraulic drive unit illustrated in FIG. 2.
Figure 4:
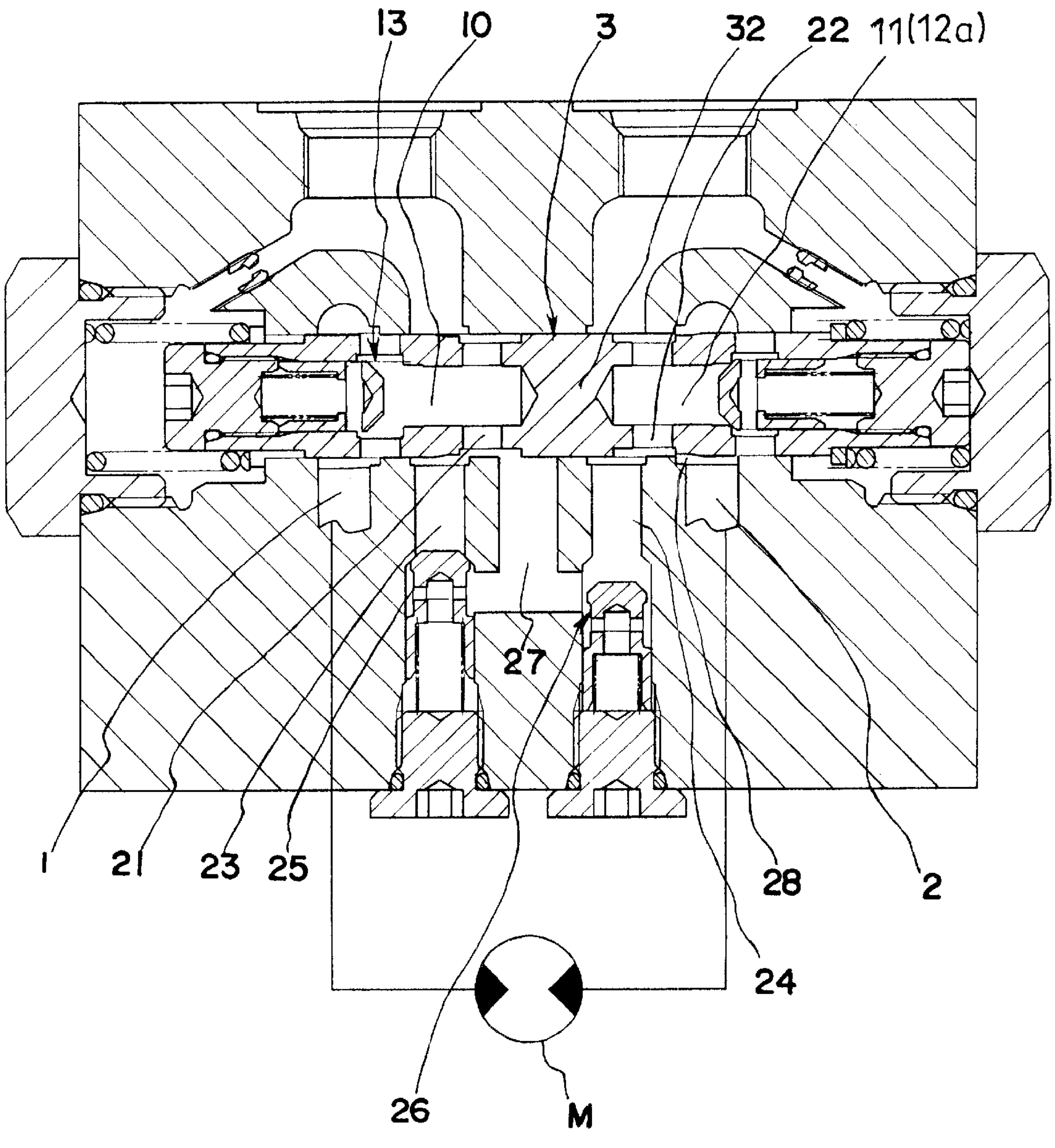
FIG. 4 is a front view in vertical section showing an operating state of the hydraulic drive unit illustrated in FIG. 2.

FIG. 1 shows a hydraulic circuit for a hydraulic drive unit according to an embodiment of the present invention and FIGS. 2 to 4 show a concrete structure of a hydraulic drive unit which utilizes the hydraulic circuit illustrated in FIG. 1.

In the hydraulic circuit for the hydraulic drive unit shown in FIG. 1, an oil pressure source and a hydraulic motor M are connected together via a pair of main circuits 1 and 2 which are utilized on a discharge side and a return side selectively, a counter-balancing valve 3 is disposed halfway of the main circuits 1 and 2 so as to be capable of being changed over from one position to another, the counter-balancing valve 3 being provided with a pair of discharge passages 10, 11 and a pair of return passages 12*a*, 12*b* which discharge and return passages are adapted to be opened and closed for the main circuits 1 and 2 and also provided with a pair of first check valves 13 and 14 halfway of the discharge passages 10 and 11, respectively, and a pilot circuit 17 provided with a spring 15 and an orifice 19 and a pilot circuit 18 provided with a spring 16 and an orifice 20 are disposed respectively on both sides of the counter-balancing valve 3.

The counter-balancing valve 3 is further provided with a pair of branch passages 21 and 22 which are connected respectively to upstream sides of the first check valves 13 and 14, return circuits 23 and 24 are connected to the main circuits 1 and 2, respectively, and a pair of second check valves 25 and 26 which permit the flow of oil from the main circuits 1 and 2 are disposed halfway of the return circuits 23 and 24, respectively.

Further, a by-pass circuit 27 is connected at one end thereof to the return circuits 23 and 24 at a position between the second check valves 25 and 26, while the opposite end of the by-pass circuit 27 is opened and closed selectively for the paired branch passages 21 and 22.

Orifices 28 and 29 are formed halfway of the paired return passages 12*a* and 12*b*, respectively. Pump ports P1 and P2 of the main circuits 1 and 2 respectively are connected to a pump side and a tank side selectively through a change-over valve.

The following description is now provided about the operation of the hydraulic drive unit based on the above hydraulic circuit.

When the pump ports P1 and P2 are connected to the pump side and the tank side respectively from a neutral position shown in FIG. 1 through a change-over valve, pressure oil is fed to one main circuit 1 to rotate the hydraulic motor M in the forward direction for example and return oil discharged as pressure oil from the motor M its returned to the tank side via the other main circuit 2.

With pressure oil fed to the pump port P1, the counter-balancing valve 3 changes over to its left-hand position in the figure against the spring 16 by virtue of a pilot pressure in the pilot circuit 17. As a result, the discharge passage 10 located on the left-hand position is connected to the main circuit 1, the branch circuit 21 is connected to the by-pass circuit 27, and the return passage 12*a* comes into communication with the other main circuit 2. Consequently, a part of pressure oil from the pump port P1 flows from the main circuit 1 to the discharge passage 10, while the other part of pressure oil therefrom flows to the discharge passage 10 via return circuit 23—second check valve 25—return circuit 24—by-pass circuit 27—branch passage 21. Then the pressure oil further opens the first check valve 13 and is fed to the hydraulic motor M via the main circuit 1 on the down stream side to rotate the motor in the forward direction. Return oil from the hydraulic motor M is returned to the tank side via the other main circuit 2—return passage 12*a*—orifice 28—pump port P2.

For driving the hydraulic motor M in the reverse direction, pressure oil is fed to the pump port P2 and the pump port P1 is brought into connection to the tank side. In this case, operations are merely reverse to the above operations.

For turning OFF the hydraulic motor M during the above steady rotation, the change-over valve is returned to the neutral state to cut off the tank ports P1 and P2 from the oil pressure source. Consequently, there no longer is any pilot pressure from the pilot circuit 17 and the counter-balancing valve 3 is returned gradually to its neutral state in FIG. 1 with the restoring force of the right-hand spring 16. In this case, for a certain time the by-pass circuit 27 is in communication with the first branch passage 21, so that the hydraulic motor M shifts in its rotation stopping direction while being slowed down. But at the beginning of turning OFF of the oil pressure source the motor M rotates by virtue of inertia, sucks in oil in the main circuit 1 and discharge the oil into the other main circuit 2. Namely, the hydraulic motor M performs a so-called pumping operation for a certain time. For this reason, the main circuit 1 side is pressure-reduced and tends to become negative in pressure, and the internal pressure of the other main circuit 2 becomes high in the presence of the orifice 28, thereby giving a braking force to the hydraulic motor M. The pressure oil passed through the orifice 28 acts on the right-hand second check valve 26 through the return circuit 24, causing the valve 26 to open. Therefore, the pressure oil in the main circuit 2 is fed to the main circuit 1 via the second check valve 26—return circuit 24—by-pass circuit 27—branch passage 21—discharge passage 10—first check valve 13, and the pressure oil in the main circuit 1 is circulated to the hydraulic motor M, whereby the generation of a negative pressure in the main circuit 1 is prevented to prevent the occurrence of cavitation.

FIG. 2 illustrates a hydraulic drive unit based on the hydraulic circuit shown in FIG. 1 according to the present invention. The details of its structure will be described below, in which the same components as in FIG. 1 will be identified by the same reference numerals as in FIG. 1.

Within a valve body 30 are formed a pair of main circuits 1 and 2 as passages which are connected to pump ports P1 and P2 and also connected to a hydraulic motor M. A valve hole 31 is formed in the valve body 30 so as to communicate with the main circuits 1 and 2 perpendicularly thereto and a counter-balancing valve 3 which changes over the main circuits 1 and 2 through opening and closing motions is inserted slidably into the valve hole 31.

Further, a pair of return circuits 23 and 24 as passages communicating with the main circuits 1 and 2 respectively through the counter-balancing valve 3 and also through the valve hole 31, as well as a by-pass circuit 27 as a passage connected to the return circuits 23 and 24, are formed within the valve body 30.

Halfway of the return circuits 23 and 24 are disposed a pair of second check valves 25 and 26 so as to be capable of being opened and closed, the second check valves 25 and 26 each comprising a poppet type valve body, a, and a spring, b.

The counter-balancing valve 3 comprises a hollow spool 32, a discharge passage 10 and a return passage 12*a* both formed within the spool 32, and a pair of first check valves 13 and 14 disposed respectively within the discharge passage 10 and the return passage 12*a* so as to be capable of being opened and closed, the first check valves 13 and 14 each comprising a valve body, C, and a spring, d. Further, in the spool 32 are formed a pair of branch passages 21 and 22 which permit the discharge passage 10 and the return passage 12*a* to be opened and closed for the by-pass circuit 27 upstream of the first check valves 13 and 14.

The discharge passage 10 and the return passage 12*a* are used on the discharge side and the return side selectively. For example, when the spool 32 is on the right-hand side in FIG. 2, pressure oil is fed to the discharge passage 10 and the return passage 12*a* is connected to the tank side to let the pressure oil return.

Within the valve body 30 a pair of pressure chambers 33 and 34 are formed on both sides of the spool 32. The pressure chambers 33 and 34 are in communication respectively with the main circuits 1 and 2 on the pump ports P1 and P2 through the pilot circuits 17 and 18, with orifices 19 and 20 being formed in the pilot circuits 17 and 18, respectively. Further, a pair of springs 15 and 16 are disposed respectively within the pressure chambers 33 and 34 and on both sides of the spool 32.

The operation of this hydraulic drive unit will be described below with reference to FIGS. 2 to 4.

In FIG. 2, the counter-balancing valve 3 is held in a neutral state, pressure oil is not fed, and the hydraulic motor M is blocked by the first check valves 13 and 14 and is OFF. If in this state the pump port P1 is connected to the pump side and the pump port P2 is connected to the tank side, pressure oil is fed to the main circuit 1. Consequently, pilot pressure acts on the left-hand pressure chamber 33 through the pilot circuit 17 and the spool 32 moves rightwards against the right-hand spring. In this state, one discharge passage 10 is open to the by-pass circuit 27 through the left-hand branch passage 21 and the right-hand return passage 12*a* is open to the return-side main circuit 2 through the right-hand branch passage 22. In this case, a clearance gap regulated with an end notch is formed between the right-hand branch passage 22 and the main circuit 2, and the clearance gap serves as an orifice 28 restricted by degrees. Once pressure oil is conducted to the main circuit 1, a part of the pressure oil flows to the discharge passage 10, while the other part of the pressure oil flows to the discharge passage 10 via return circuit 24—by-pass circuit 27—branch passage 21 after opening the second check valve 25.

In this manner, when pressure oil is conducted into the left-hand discharge passage 10, the pressure thereof causes the left-hand first check valve 13 to open, allowing the pressure oil to be conducted to the inflow-side main circuit 1 in the hydraulic motor M. Consequently, with the pressure oil in the main circuit 1, the hydraulic motor M rotates in the forward direction, and the pressure oil returned from the hydraulic motor M is further returned to the tank via the other main circuit 2—orifice 28—return passage 12*a*—pump port P2.

For stopping the hydraulic motor M during the above operation, the pump ports P1 and P2 are cut off from the oil pressure source. At this time, however, in a certain time zone until complete return to the neutral position of the counter-balancing valve 3 for example, the spool 32 is still in its right-hand position as in FIG. 4 though the spool 32 moves leftwards in degrees. With the gradual restricting of the orifice 28, the left-hand first check valve 13 is opened, allowing the hydraulic motor M to shift to OFF while slowing down. As the hydraulic motor M begins t slow down, the pumping operation of the hydraulic motor M is performed, whereby pressure oil of one main circuit 1 is sucked in and the main circuit 1 is reduced in pressure, while the pressure oil is discharged to the other main circuit 2, the inside of which becomes high in pressure in the presence of the orifice 28, thereby giving a braking force to the hydraulic motor M. The pressure oil passed through the orifice 28 acts on the right-hand second check valve 26 through the return circuit 24, causing the valve 26 to open. Consequently, the pressure oil present in the main circuit 2 is fed to the main circuit 1 circulatively via the return circuit 24—second check valve 26—by-pass circuit 27—branch passage 21—discharge passage 10—first check valve 13 to prevent the internal pressure of the main circuit 1 from becoming negative and prevent the occurrence of cavitation. When this state is over, the spool 32 moves toward its original position under the action of the right-hand spring 16 and is restored to its state shown in FIG. 2, whereby the hydraulic motor M is blocked completely and turns OFF.

Figure 5:
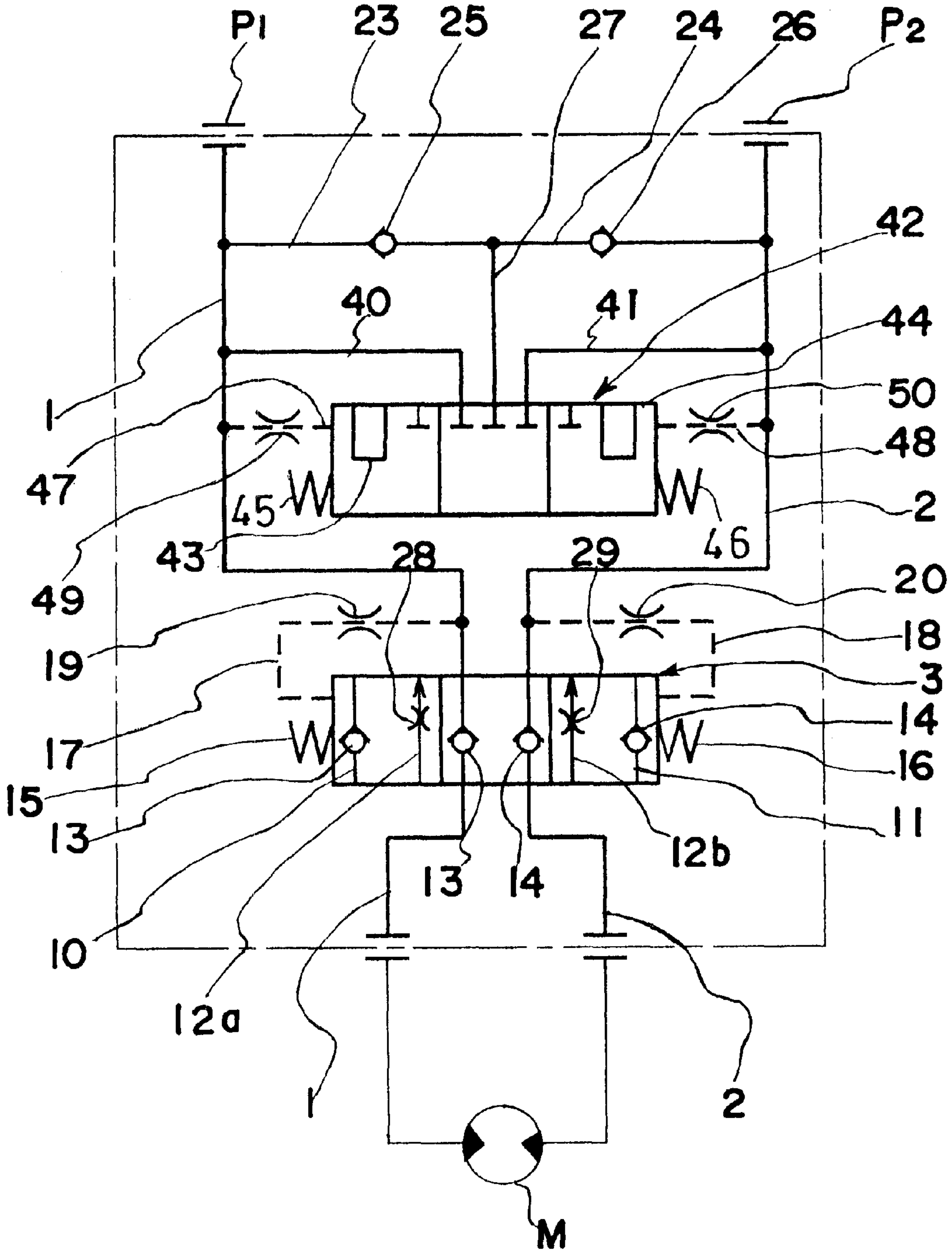
FIG. 5 is a circuit diagram for a hydraulic drive unit according to another embodiment of the present invention.

FIG. 5 illustrates a hydraulic circuit for a hydraulic drive unit according to another embodiment of the present invention. In this hydraulic circuit, in addition to the circuit components used in the embodiment illustrated in FIG. 1, a second by-pass circuit is provided in parallel and a change-over valve is provided in the second by-pass circuit. In this embodiment, therefore, the same components as in the embodiment illustrated in FIG. 1 will be identified by the same reference numerals as in FIG. 1.

In the hydraulic circuit shown in FIG. 5, an oil pressure source and a hydraulic motor M are connected together via a pair of main circuits 1 and 2 capable of being utilized on a discharge side and a return side selectively, a counter-balancing valve 3 is disposed halfway of the main circuits 1 and 2 so as to be capable of being changed over from one position to another, the counter-balancing valve 3 being provided with a pair of discharge passages 10, 11 and a pair of return passages 12*a*, 12*b* which discharge and return passages are adapted to be opened and closed for the main circuits 1 and 2 and also provided with a pair of fist check valves 13 and 14 disposed halfway of the discharge passages 10 and 11 respectively, and a pilot circuit 17 provided with a spring 15 and an orifice 19 and a pilot circuit 18 provided with a spring 16 and an orifice 20 are disposed respectively on both sides of the counter-balancing valve 3.

Return circuits 23 and 24 are connected between the paired main circuits 1 and 2 and a pair of second check valves 25 and 26 which permit the flow of oil from the main circuits 1 and 2 are disposed halfway of the return circuits 23 and 24, respectively. A first by-pass circuit 27 is connected to the return circuits 23 and 24 at a position between the second check valves 23 and 24. Further, second by-pass circuits 40 and 41 are connected between the main circuits 1 and 2 in parallel with the return circuits 23 and 24, and a change-over valve 42 adapted to be changed over from one position to another with an internal pressure of one of the main circuits 1 and 2 is disposed halfway of the second by-pass circuits 40 and 41. With operation of the change-over valve 42 the first by-pass valve 27 is opened and closed selectively for the second by-pass circuits 40 and 41.

The change-over valve 42 is provided with a pair of by-pass ports 43 and 44, and a spring 45 and a pilot circuit 47 connected to the main circuit 1, as well as a spring 46 and a pilot circuit 48 connected to the main circuit 2, are disposed respectively on both sides of the change-over valve 42, with orifices 49 and 50 being formed within the pilot circuits 47 and 48, respectively. The constructions and operations of the main circuits 1 and 2, counter-balancing valve 3, return circuits 23 and 24, by-pass circuit 27, and hydraulic motor M are substantially the same as in the previous embodiment illustrated in FIG. 1.

While the hydraulic motor M is OFF, the change-over valve 42 is held in its neutral position shown, and when oil is fed to a pump port P1, the change-over valve 42 moves rightwards with a pilot pressure provided from the main circuit 1 and the pilot circuit 47 and the by-pass port 43 provides a connection between the second by-pass circuit 40 and the first by-pass circuit 27, while the other second by-pass circuit 41 is closed. In this state, if pump ports P1 and P2 are cut off from the oil pressure source, the hydraulic motor M shifts in its OFF direction while being decelerated for a certain time and the pumping operation through the hydraulic motor M is performed to reduce the internal pressure of one main circuit 1, while the internal pressure of the other main circuit 2 becomes high. As a result, the check valve 26 is opened through the right-hand return circuit 24 and the high-pressure oil present in the main circuit 2 is introduced into the first by-pass circuit 27 and is further introduced into the main circuit 1 through the by-pass port 43 in the change-over valve 42 and further through the second by-pass circuit 40, thereby preventing the occurrence of a negative pressure in the main circuit 1 and also preventing the occurrence of cavitation.

Figure 6:
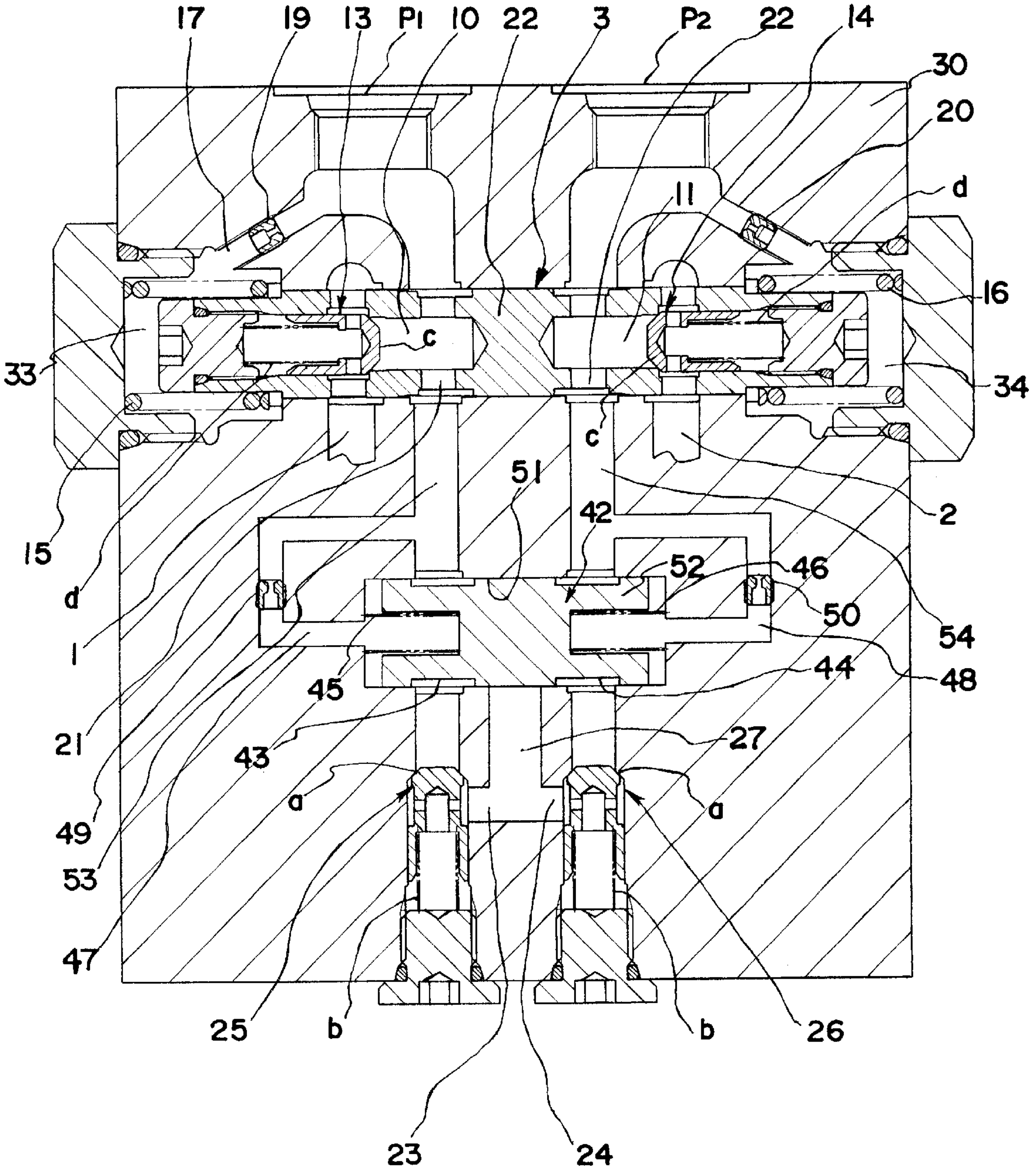
FIG. 6 is a front view in vertical section of a hydraulic drive unit based on the circuit illustrated in FIG. 5.

FIG. 6 shows a hydraulic drive unit based on the hydraulic circuit illustrated in FIG. 5 according to the present invention. Since a basic structure thereof is the same as in the embodiment illustrated in FIG. 1, the same components as in FIG. 1 are identified by the same reference numerals as in FIG. 1 and explanations thereof will be omitted.

Within a valve body 30 are formed a pair of passages 53 and 54 which are connected to main circuits 1 and 2, respectively, and which are also connected to return circuits 23 and 24 through second check valves 25 and 26, respectively. A valve hole 51 is in communication with the passages 53 and 54 perpendicularly thereto and the change-over valve 42 constituted by a spool 52 is inserted slidably into the valve hole 51. The change-over valve 42 and the valve hole 51 are disposed in parallel with the return circuits 23 and 24 and the change-over valve 42 functions to connect a by-pass circuit 27 to the passages 53 and 54 selectively. Pilot circuits 47 and 48 are in communication with valve hole portions of the valve hole 51 located on both sides of the change-over valve 42, with the opposite ends of the pilot circuits 47 and 48 being open to the passages 53 and 54, respectively. The passages 53 and 54 are common oil passages for the circuits 23, 24 and the circuits 40, 41, shown in FIG. 5. Annular grooves serving as by-pass ports 43 and 44 are formed in the spool 52.

The operation of this hydraulic drive unit will be described below.

When pressure oil is fed to a pump port P1, it is then fed to the hydraulic motor M through the main circuit 1 and is also fed to the passage 53. Consequently, with a pilot pressure from the pilot circuit 47, the spool 52 of the change-over valve 42 moves rightwards in FIG. 6 and the first by-pass circuit 27 is connected to the passage 53 through the valve hole 51 and the annular groove serving as the by-pass port 43. If in this state the supply of pressure oil is stopped to turn OFF the hydraulic motor M, then in a certain time zone the internal pressure of the main circuit 2 becomes high and causes the second check valve 26 to open through the passage 54. Further, the pilot pressure is exerted on the right-hand side of the change-over valve 42 through the pilot circuit 48, causing the change-over valve 42 to move leftwards. But in the initial stage of this operation the by-pass port 43 is open and so is the check valve 26, so that the high-pressure oil provided from the main circuit 2 is fed to the main circuit 1 via passage 54—check valve 26—return circuit 24—by-pass circuit 27—by-pass port 43—passage 53—discharge passage 10 and first check valve 13 in the counter-balancing valve 3 to prevent the occurrence of cavitation in the main circuit 1.

Figure 7:
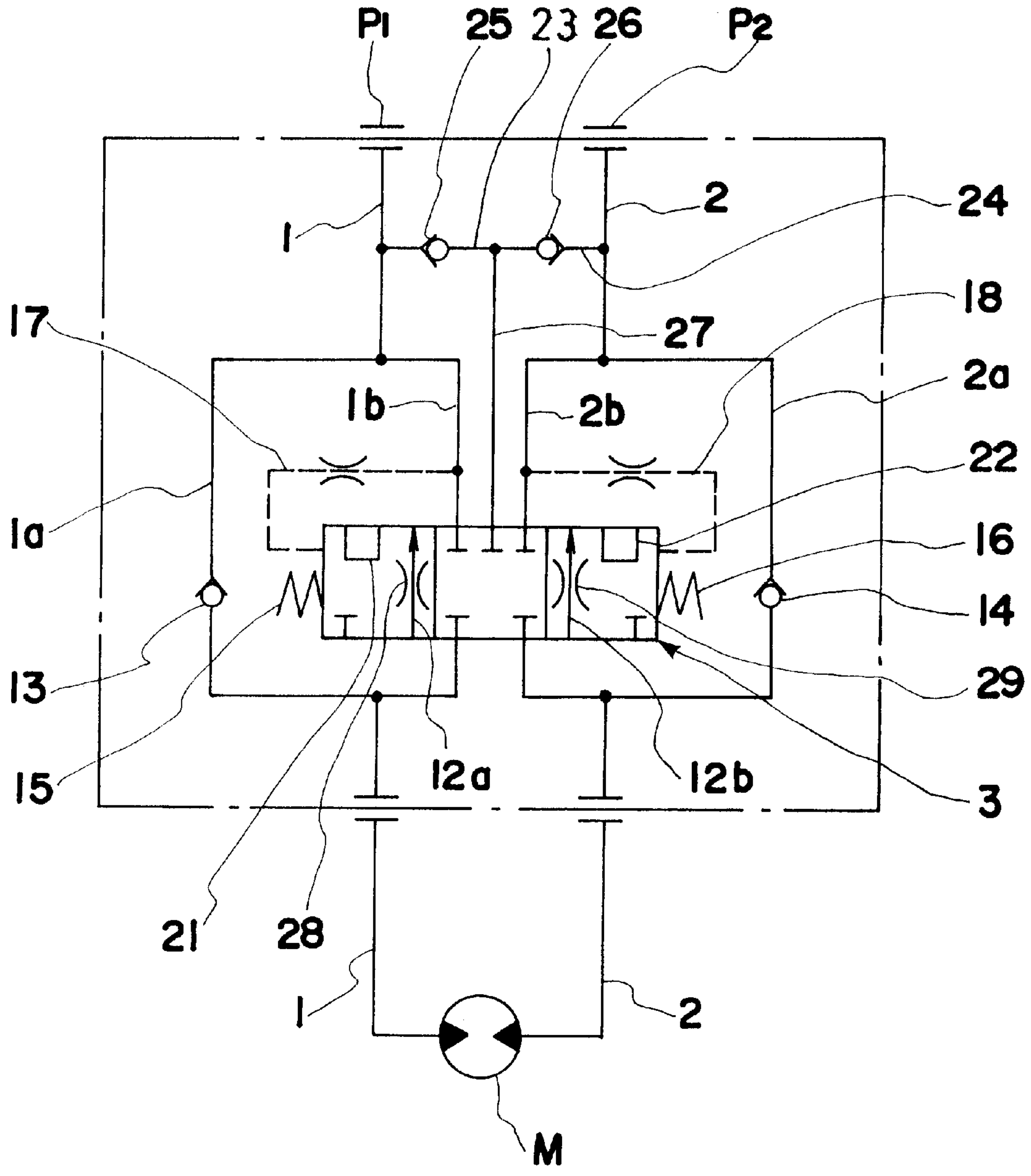
FIG. 7 is a circuit diagram for a hydraulic drive unit according to a further embodiment of the present invention.

FIG. 7 is a circuit diagram for a hydraulic drive unit according to a further embodiment of the present invention, which is a slight modification of the main circuits shown in FIG. 1. Main circuits 1 and 2 used in this embodiment are provided halfway with parallel first main circuits 1*a,* 2*a* and second main circuits 1*b,* 2*b,* and first check valves 13 and 14 are disposed in the first main circuits 1*a* and 2*a,* respectively. In other words, in FIG. 1, the first check valves 13 and 14 of the counter-balancing valve 3 are provided in the first main circuits 1*a* and 2*a,* respectively.

More specifically, in the circuit diagram for a hydraulic drive unit illustrated in FIG. 7, an oil pressure source and a hydraulic motor M are connected together via a pair of main circuits 1 and 2 which can be utilized on a discharge side and a return side selectively. The main circuits 1 and 2 have parallel first main circuits 1*a,* 2*a* and second main circuits 1*b,* 2*b,* first check valves 13 and 14 are disposed halfway of the first main circuits 1*a* and 2*a,* respectively, and a counter-balancing valve 3 is disposed halfway of the second main circuits 1*b*and 2*b* so as to be capable of being changed over from one position to another. The counter-balancing valve 3 is provided with a pair of branch passages 21, 22 and a pair of return passages 12*a,* 12*b* which branch and return passages are adapted to be opened and closed for the second main circuits 1*b*and 2*b,* and further provided with restrictions 28 and 29. A spring 15 and a pilot circuit 17 connected to the second main circuit 1*b,* as well as a spring 16 and a pilot circuit 18 connected to the second main circuit 2*b,* are disposed respectively on both sides of the counter-balancing valve 3. Further, return circuits 23 and 24 are connected to the main circuits 1 and 2 respectively, and a pair of second check valves 25 and 26 which permit the flow of oil from the main circuits 1 and 2 are disposed halfway of the return circuits 23 and 24. A by-pass circuit 27 is connected at one end thereof to the return circuits 23 and 24 at a position between the second check valves 25 and 26 and the opposite end of the by-pass circuit 27 is opened and closed selectively for the paired branch circuits 21 and 22. For example, when pressure oil is fed to one main circuit 1, the counter-balancing valve 3 changes over to its left-hand position in FIG. 7, so that pressure oil is fed to the hydraulic motor M via the first main circuit la and the first check valve 13 and return oil from the hydraulic motor M is returned to the tank side via the other main circuit 2, return passage 12*a* and restriction 28. Other structural points, as well as functions and effects, are the same as in the embodiment illustrated in FIG. 1.

Figure 8:
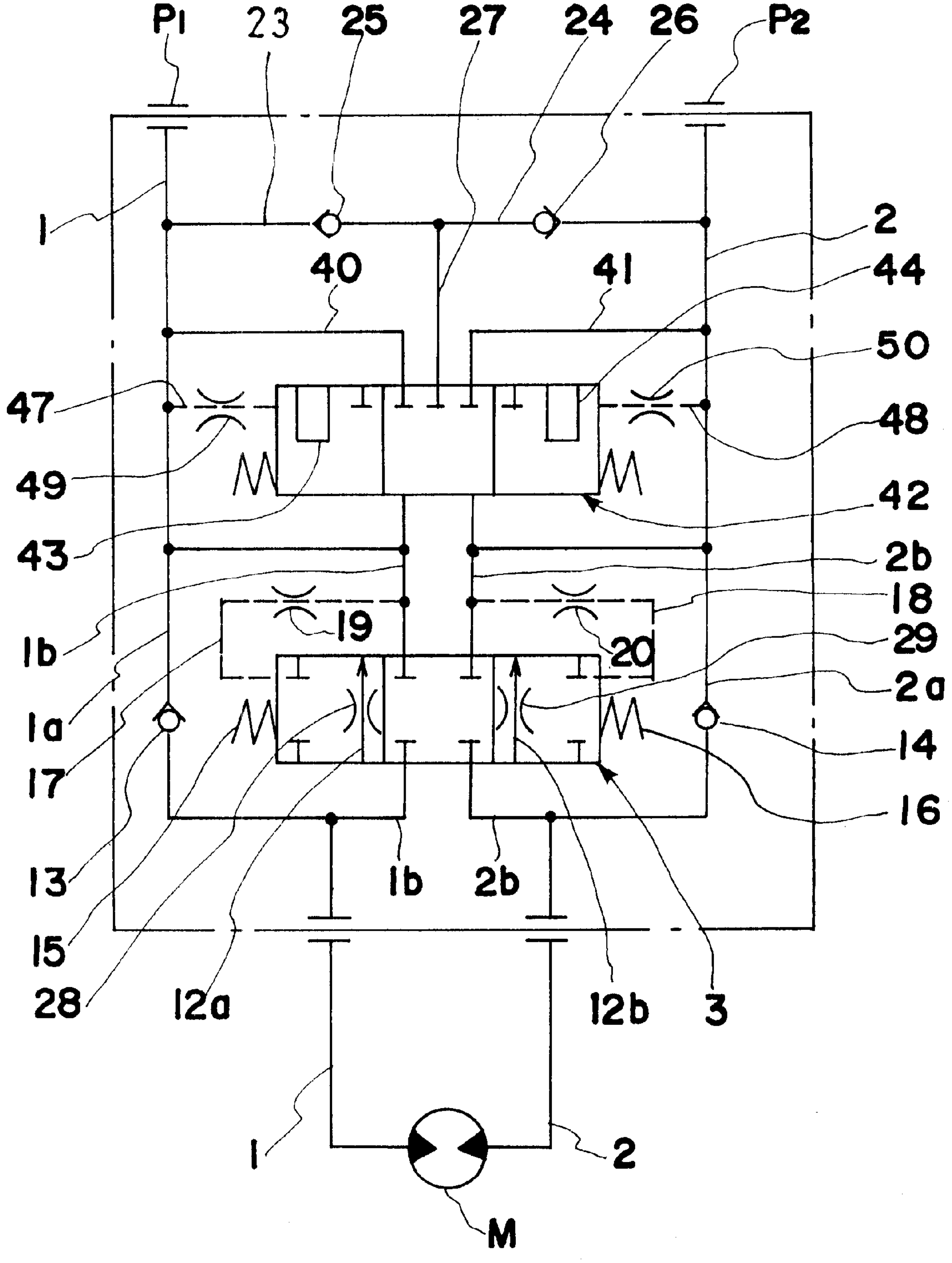
FIG. 8 is a circuit diagram for a hydraulic drive unit according to a still further embodiment of the present invention.

FIG. 8 is a circuit diagram for a hydraulic drive unit according to a still further embodiment of the present invention. This embodiment, like the embodiment illustrated in FIG. 7, is a slight modification of the main circuits 1, 2 and counter-balancing valve 3 used in the hydraulic circuit of FIG. 5. In this embodiment, main circuits 1 and 2 are provided with first main circuits 1*a,* 2*a* and second main circuits 1*b,* 2*b,* and the first check valves 13 and 14 shown in FIG. 5 are disposed in the first main circuits 1*a* and 2*a,* respectively. More specifically, in the hydraulic circuit for a hydraulic drive unit illustrated in FIG. 8, an oil pressure source and a hydraulic motor M are connected together via a pair of main circuits 1 and 2 which can be utilized on a discharge side and a return side selectively. The main circuits 1 and 2 are provided with parallel first main circuits 1*a,* 2*a* and second main circuits 1*b,* 2*b,* and first check valves 13 and 14 are disposed halfway of the first main circuits 1*a* and 2*a,* respectively. A counter-balancing valve 3 is disposed halfway of the second main circuits 1*b*and 2*b* so as to be capable of being changed over from one position to another, the counter-balancing valve 3 being provided with a pair of return passages 12*a* and 12*b* which are adapted to be opened and closed for the second main circuits 1*b*and 2*b,* respectively, and also provided with restrictions 28 and 29. A spring 15 and a pilot circuit 17 connected to the second main circuit 1*b,* as well as a spring 16 and a pilot circuit 18 connected to the second main circuit 2*b,* are disposed respectively on both sides of the counter-balancing valve 3. Further, return circuits 23 and 24 are connected to the main circuits 1 and 2 and a pair of second check valves 25 and 26 which permit the flow of oil from the main circuits 1 and 2 are disposed halfway of the return circuits 23 and 24. A first by-pass circuit 27 is connected to the return circuits 23 and 24 at a position between the second check valves 25 and 26 and second by-pass circuits 40 and 41 are connected between the paired main circuits 1 and 2 in parallel with the return circuits 23 and 24. A change-over valve 42 adapted to be changed over its position with the internal pressure of one of the main circuits 1 and 2 is disposed halfway of the second by-pass circuits 40 and 41, and in accordance with operation of the change-over valve 42 the first by-pass circuit 27 is opened and closed selectively for the second by-pass circuit 40 or 41.

In this hydraulic circuit, for example when pressure oil is fed to the main circuit 1, it is fed to the hydraulic motor M via the first main circuit 1*a* and the first check valve 13, while return oil is returned to the tank side via the other main circuit 2, return passage 12*a* and restriction 28. Other structural points, as well as functions and effects, are the same as in the embodiment illustrated in FIG. 5.

In each of the above embodiments, for example in the hydraulic drive unit shown in FIG. 2, a land groove may be formed in the valve hole 31 as in a hydraulic drive unit illustrated in FIG. 14 which will be described later.

To be more specific, there may be adopted a construction wherein the counter-balancing valve 3 is inserted into the valve hole 31 of the valve body 30, a land groove is formed in the inner periphery of the valve hole 31, and the by-pass circuit 27 and the branch circuit 21 are opened and closed through the land groove in accordance with the stroke of the counter-balancing valve 3.

In this case, both by-pass circuit 27 and branch circuit can open widely through the land groove, thus permitting sufficient flow of the hydraulic actuating oil and thereby permitting an effective prevention of the occurrence of cavitation.

Figure 9:
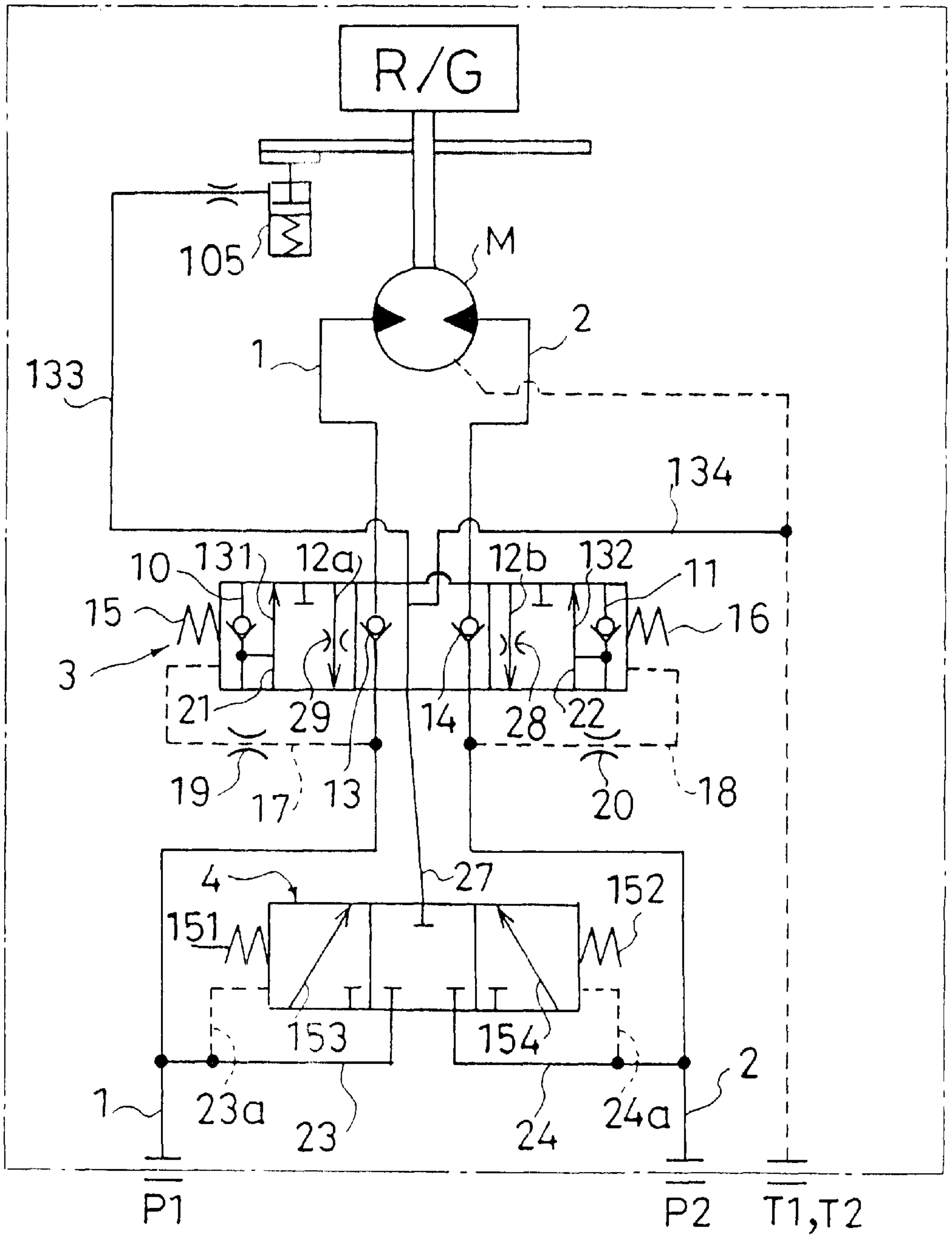
FIG. 9 is a circuit diagram for a hydraulic drive unit according to a still further embodiment of the present invention.

FIG. 9 illustrates a hydraulic circuit according to a still further embodiment of the present invention and FIGS. 10 to 13 illustrate a concrete structure of a hydraulic drive unit which utilizes this hydraulic circuit.

In the hydraulic circuit for a hydraulic drive unit illustrated in FIG. 9, as in the embodiment illustrated in FIG. 1, an oil pressure source and a hydraulic motor M are connected together via a pair of main circuits 1 and 2 which are utilized on a discharge side and a return side selectively, a counter-balancing valve 3 is disposed halfway of the main circuits 1, 2 and so as to be capable of being changed over from one position to another, the counter-balancing valve 3 being provided with a pair of discharge passages 10, 11 and a pair of return passages 12*a*, 12*b* which discharge and return passages are adapted to be opened and closed for the main circuits 1 and 2 and also provided with a pair of first check valves 13 and 14 disposed halfway of the discharge passages 10 and 11, respectively, and a spring 15 and a pilot circuit 17 having an orifice 19, as well as a spring 16 and a pilot circuit 18 having an orifice 20, are disposed respectively on both sides of the counter-balancing valve 3.

Further, a pair of branch passage 21, 22 and a pair of auxiliary circuits 131, 132, which are connected upstream of the first check valves 13 and 14, are provided in the counter-balancing valve 3. Return circuits 23 and 24 are connected to the main circuits 1 and 2, respectively, and a high pressure selection valve 4 is disposed halfway of the return circuits 23 and 24, the high pressure selection valve 4 being adapted to change over its position with a pilot pressure provided from the main circuit 1 or 2 and permitting the flow of oil from the main circuit 1 or 2 located on the return side.

A by-pass circuit 27 is connected at one end thereof to the return circuits 23 and 24 on a downstream side of the high pressure selection valve 4 and the opposite end of the by-pass circuit 27 is opened and closed selectively for the paired branch passages 21 and 22.

The high pressure selection valve 4 has a neutral position and two right and left positions and is provided with pilot circuits 23*a* and 24*a* which are opposed to springs 151 and 152 disposed on both sides and which receive pilot pressures from the main circuits 1 and 2. The high pressure selection valve 4 is also provided with passages 153 and 154 which come into communication with the by-pass circuit 27 at the time of change-over of the return circuits 23 and 24. Further provided is a brake cylinder 105 in a brake mechanism which controls the hydraulic motor M. The brake cylinder 105 is connected to drain lines T1 and T2 via circuit 133, counter-balancing valve 3 and circuit 134. Upon changing over of the counter-balancing valve 3 the drain lines T1 and T2 are cut off and the brake cylinder 105 is connected to the auxiliary circuit 131 or 132.

Orifices 29 and 28 are formed halfway of the paired return passages 12*a* and 12*b*, respectively. Further, pump ports P1 and P2 of the main circuits 1 and 2 respectively are connected to the pump side and the tank side selectively through a change-over valve.

The following description is now provided about the operation of the hydraulic circuit configured as above.

When the pump ports P1 and P2 are connected from the neutral position shown in FIG. 9 to the pump side and the tank side, respectively, through the change-over valve, pressure oil is fed to one main circuit 1 to rotate the hydraulic motor M in the forward direction for example and return oil discharged from the motor M is returned to the tank side through the other main circuit 2.

When pressure oil is fed to the pump port P1, the high pressure selection valve 4 changes over to its left-hand position against the spring 152 by virtue of a pilot pressure from the pilot circuit 23*a*. Likewise, with a pilot pressure from the pilot circuit 17, the counter-balancing valve 3 changes over to its left-hand position in the figure against the spring 16. As a result, the discharge passage 10 located at the left-hand position is connected to the main circuit 1, the branch passage 21 is connected to the by-pass circuit 27, the auxiliary passage 131 connects to the circuit 133, and the return passage 12*a* comes into communication with the main circuit 2. Consequently, the pressure oil from the pump port P1 is fed to the hydraulic motor M via discharge passage 10—first check valve 13—main circuit 1, causing the hydraulic motor M to rotate in the forward direction. Return oil from the hydraulic motor M is returned to the tank side via the main circuit 2—return passage 12*a*—orifice 29—pump port P2.

On the other hand, the oil conducted to the auxiliary circuit 131 is introduced into the brake cylinder 105 via the circuit 133 to release the brake. For rotating the hydraulic motor M in the reverse direction, pressure oil is fed to the pump port P2 and the pump port P1 is connected to the tank side. In this case there are performed operations merely reverse to the above operations.

For stopping the hydraulic motor M during the above steady rotation, the change-over valve is returned to its neutral state to cut off the pump ports P1 and P2 from the oil pressure source. As a result, there no longer is any pilot pressure from the pilot circuit 17 and the counter-balancing valve 3 is returned gradually to its neutral state shown in FIG. 9 with the restoring force of the right-hand spring 16. In this case, for a certain time, the by-pass circuit 27 is in communication with the first branch passage 21. Consequently, the hydraulic motor M shifts to its turning OFF direction while being slowed down. But at the beginning of turning OFF of the oil pressure source the motor still rotates by virtue of inertia. Thus, the pumping operation of the hydraulic motor M is performed for a certain time and the pressure of the main circuit 1 side is reduced and tends to become negative, while the internal pressure of the other main circuit 2 becomes high in the presence of the orifice 29, thereby giving a braking force to the hydraulic motor M. The pressure oil passed through the orifice 29 acts as a pilot pressure via the pilot circuit 24*a*, causing the high pressure selection valve 4 to change over to its right-hand position and connecting the return circuit 24 to the by-pass circuit 27. As a result, the pressure oil present in the main circuit 2 is fed to the main circuit 1 via the return circuit 24—by-pass circuit 27—branch passage 21—discharge passage 10—first check valve 13 and the pressure oil in the main circuit 1 is circulated to the hydraulic motor M, whereby the occurrence of a negative pressure in the main circuit 1 and the occurrence of cavitation are prevented. Pressure oil is also fed to the brake cylinder 105 via the auxiliary passage 131 and circuit 133 to keep the brake released.

Figure 10:
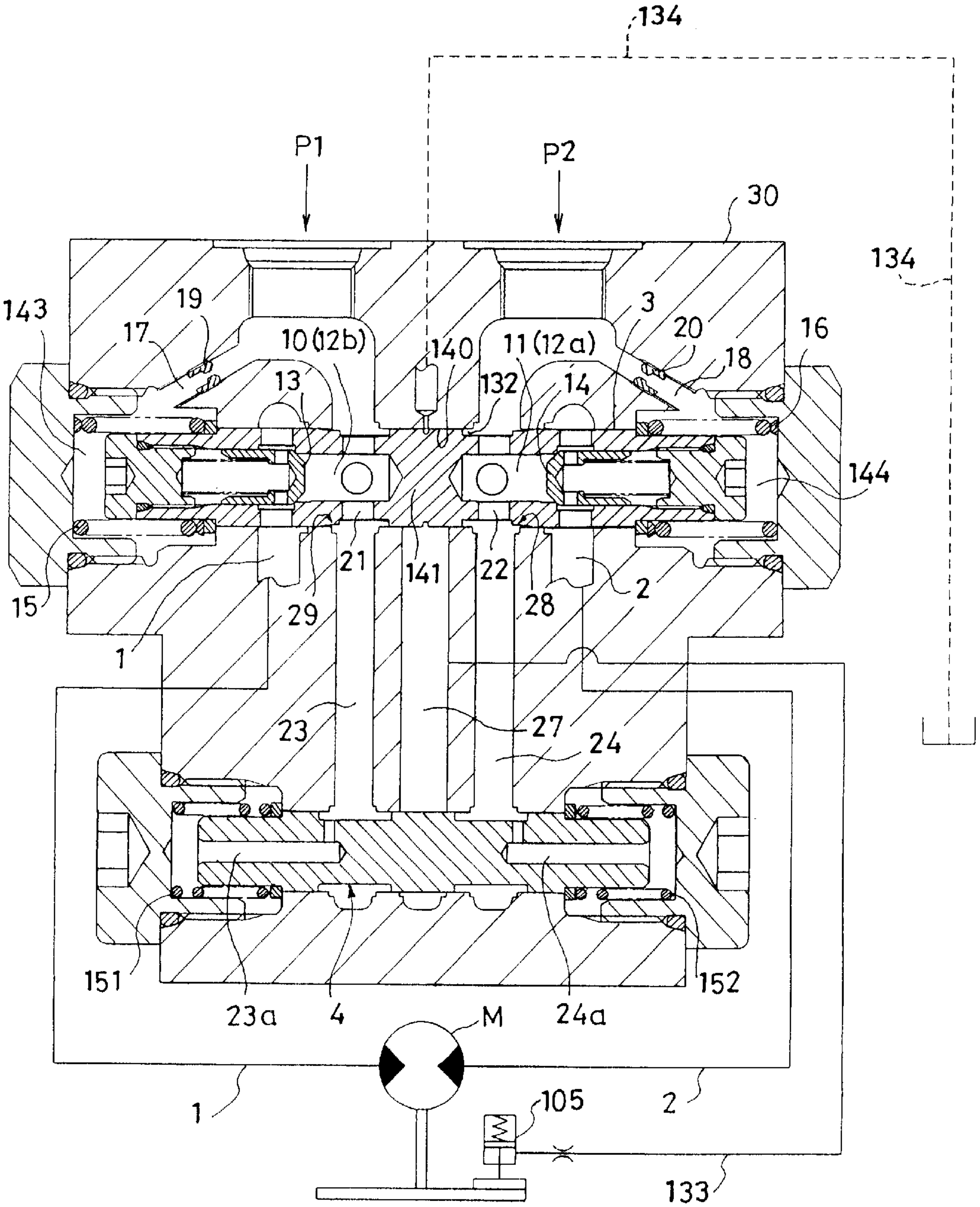
FIG. 10 is a front view in vertical section of a hydraulic drive unit based on the circuit illustrated in FIG. 9.
Figure 11:
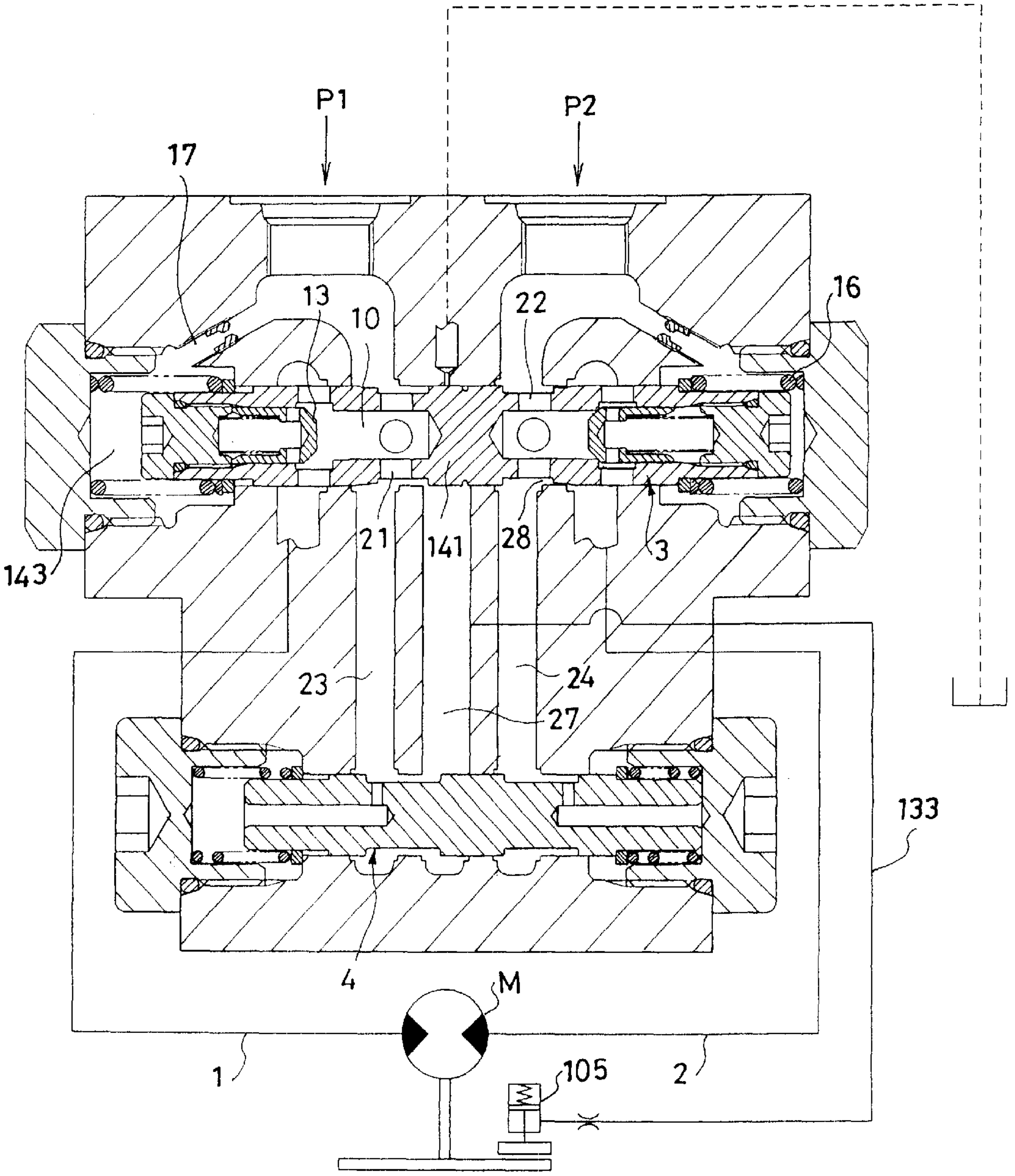
FIG. 11 is a front view in vertical section showing an operating state of the hydraulic drive unit illustrated in FIG. 110.

FIG. 10 illustrates a hydraulic drive unit based on the hydraulic circuit shown in FIG. 9. The details of its structure will be described below, in which the same components as in FIG. 9 are identified by the same reference numerals as in FIG. 9.

Within a valve body 30 are formed a pair of main circuits 1 and 2 as passages connected to oil pressure source-side pump ports P1, P2 and also connected to a hydraulic motor M. A valve hole 140 communicating with the main circuits 1 and 2 perpendicularly thereto is formed in the valve body 30 and a counter-balancing valve 3 which changes over the main circuits 1 and 2 for opening and closing motions is inserted slidably into the valve hole 140.

Within the valve body 30 are further formed a pair of return circuits 23 and 24 as passages communicating respectively with the main circuits 1 and 2 via the counter-balancing valve 3 and the valve hole 140, as well as a by-pass circuit 27 as a passage connected to the return circuits 23 and 24.

A spool type high pressure selection valve 4 is inserted movably halfway of the return circuits 23 and 24. In the body of the high pressure selection valve 4 are formed left and right pilot circuits 23*a,* 24*a,* and springs 151 and 152 are mounted on the left and right sides, respectively, of the valve body.

In the counter-balancing valve 3 there are provided a hollow spool 141, a discharge passage 10 and a return passage 12*a* both formed within the spool 141, and a pair of first check valves 13 and 14 each comprising a valve body and a spring, the first check valves 13 and 14 being inserted into the discharge passage 10 and the return passage 12*a* respectively so as to be capable of being opened and closed. In the spool 141 are formed a pair of branch passages 21 and 22 which cause the discharge passage 10 and the return passage 12*a* to be opened and closed for the by-pass circuit 27 upstream of the first check valves 13 and 14.

The discharge passage 10 and the return passage 12*a* are used on the discharge side and the return side selectively. For example, when the spool 141 is at its right-hand position in FIG. 10, pressure oil is fed to the discharge passage 10 and the return passage 12*a* is connected to the tank side for the return of pressure oil.

Within the valve body 30, a pair of pressure chambers 143 and 144 are formed on both sides of the spool 32 and are in communication respectively with pump port P1-, P2-side main circuits 1 and 2 via pilot circuits 17 and 18, with orifices 19 and 20 being formed within the pilot circuits 17 and 18, respectively. Further, a pair of springs 15 and 16 are mounted within the pressure chambers 143 and 144, respectively, and on both sides of the spool 141.

The operation of this hydraulic drive unit will be described below with reference to FIGS. 10 to 13.

In the state shown in FIG. 10, the counter-balancing valve 3 is held in its neutral state, pressure oil is not fed, and the hydraulic motor M is blocked by the first check valves 13 and 14 and is OFF. In this state, if the pump ports P1 and P2 are connected to the pump side and the tank side, respectively, as in FIG. 10, pressure oil is fed to the main circuit 1, so that the pilot pressure acts on the left-hand pressure chamber 143 through the pilot circuit 17 and the spool 141 moves rightwards against the right-hand spring 16, passes its position shown in FIG. 11 and reaches its position shown in FIG. 12. In this state, one discharge passage 10 opens to the by-pass circuit 27 through the left-hand branch passage 21 and the right-hand return passage 12*a* opens to the return-side main circuit 2 through the right-hand branch passage 22. In this case, between the right-hand branch passage 22 and the main circuit 2 there is formed a clearance gap regulated with an end notch of the land of the spool 141, and the clearance gap serves as an orifice 28.

On the other hand, when pressure oil is conducted into the left-hand discharge passage 10, the oil pressure thereof causes the left-hand first check valve 13 to open, allowing the pressure oil to be conducted to the main circuit 1 on the inflow side of the hydraulic motor M. The pressure oil in the main circuit 1 is also conducted to the pilot circuit 23*a* through the return circuit 23, causing the high pressure selection valve 4 to move rightwards to connect the by-pass circuit 27 to the return circuit 23. Then, the pressure oil conducted to the by-pass circuit 27 is conducted to the brake cylinder 105 through the circuit 133. Therefore, the hydraulic motor M rotates in the forward direction with the pressure oil in the main circuit 1 and the pressure oil returned from the hydraulic motor M is returned to the tank via the other main circuit 2—orifice 28—branch passage 22—return passage 12*a*—pump port P2.

Figure 12:
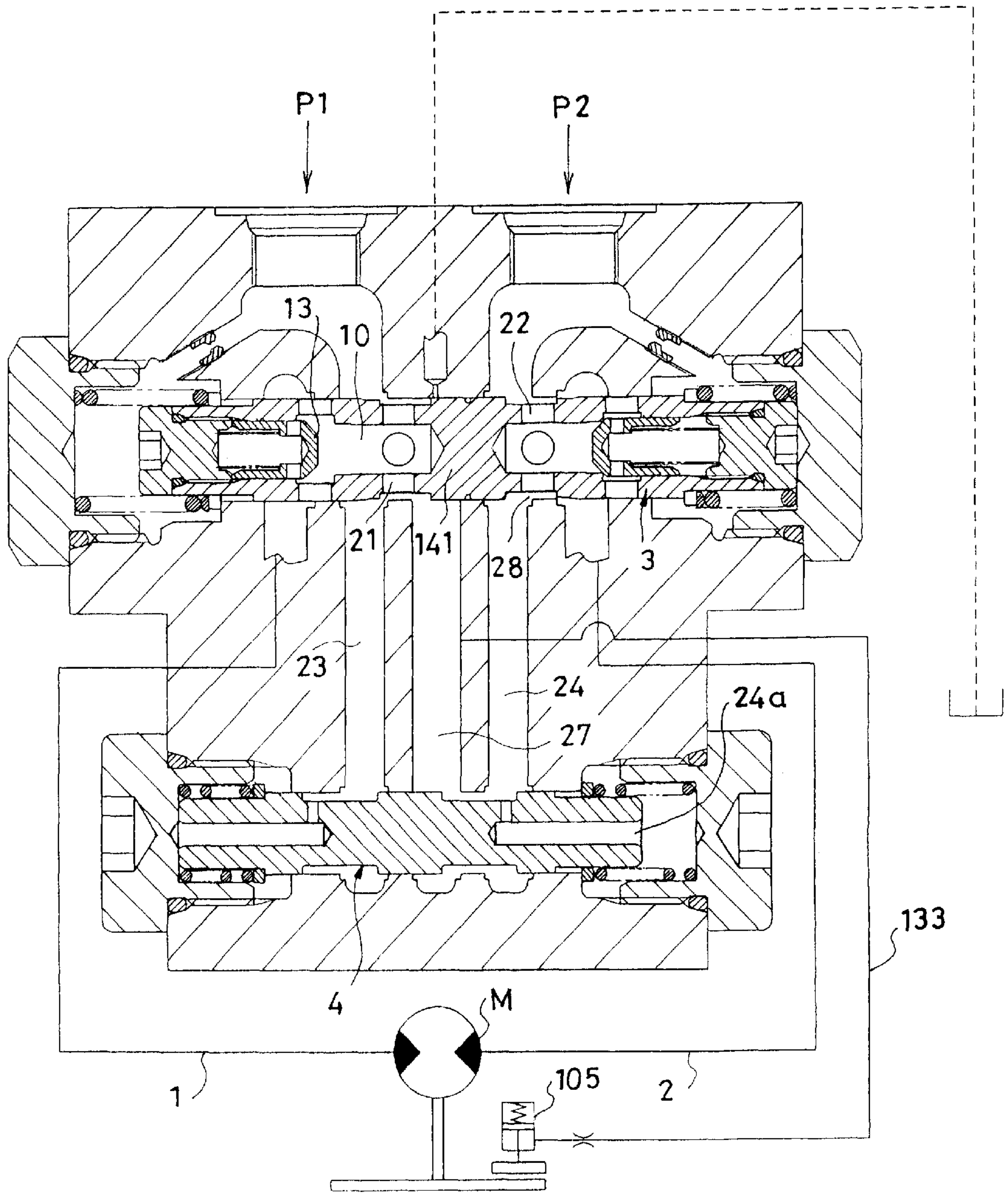
FIG. 12 is a front view in vertical section showing an operating state of the hydraulic drive unit illustrated in FIG. 10.

For stopping the hydraulic motor M during the above operation, the pump ports P1 and P2 are cut off from the oil pressure source. In this case, however, in a certain time zone until complete return of the counter-balancing valve 3 to its neutral position for example, the spool 141 still occupies the right-hand position, as shown in FIG. 12 though the spool 141 moves leftwards in degrees. With the gradual restricting of the orifice 28, the left-hand first check valve 13 located on the left-hand side is opened, allowing the hydraulic motor M to shift to an OFF state while slowing down. Once the hydraulic motor M begins to slow down, the pumping operation of the hydraulic motor M is performed, whereby pressure oil of one main circuit 1 is sucked in and the main circuit 1 is reduced in pressure, while the pressure oil is discharged to the other main circuit 2, the inside of which becomes high in pressure in the presence of the orifice 28, thereby giving a braking force to the hydraulic motor M. The pressure oil passed through the orifice 28 acts on the right-hand side of the high pressure selection valve 4 from the return circuit 24 through the pilot circuit 24*a,* causing the valve 4 to move leftwards. Therefore, connecting the return circuit 24 to the by-pass circuit 27, as shown in FIG. 12, the pressure oil present in the main circuit 2 is circulated to the main circuit 1 via he return circuit 24—by-pass circuit 27—branch passage 21—discharge passage 10—first check valve 13, thereby preventing the occurrence of a negative pressure in the main circuit 1 and preventing the occurrence of cavitation. After this state, the spool 141 moves toward its original position under the action of the right-hand spring 16 and is restored to its state shown in FIG. 9, so that the hydraulic motor M is blocked completely and turns OFF.

Figure 13:
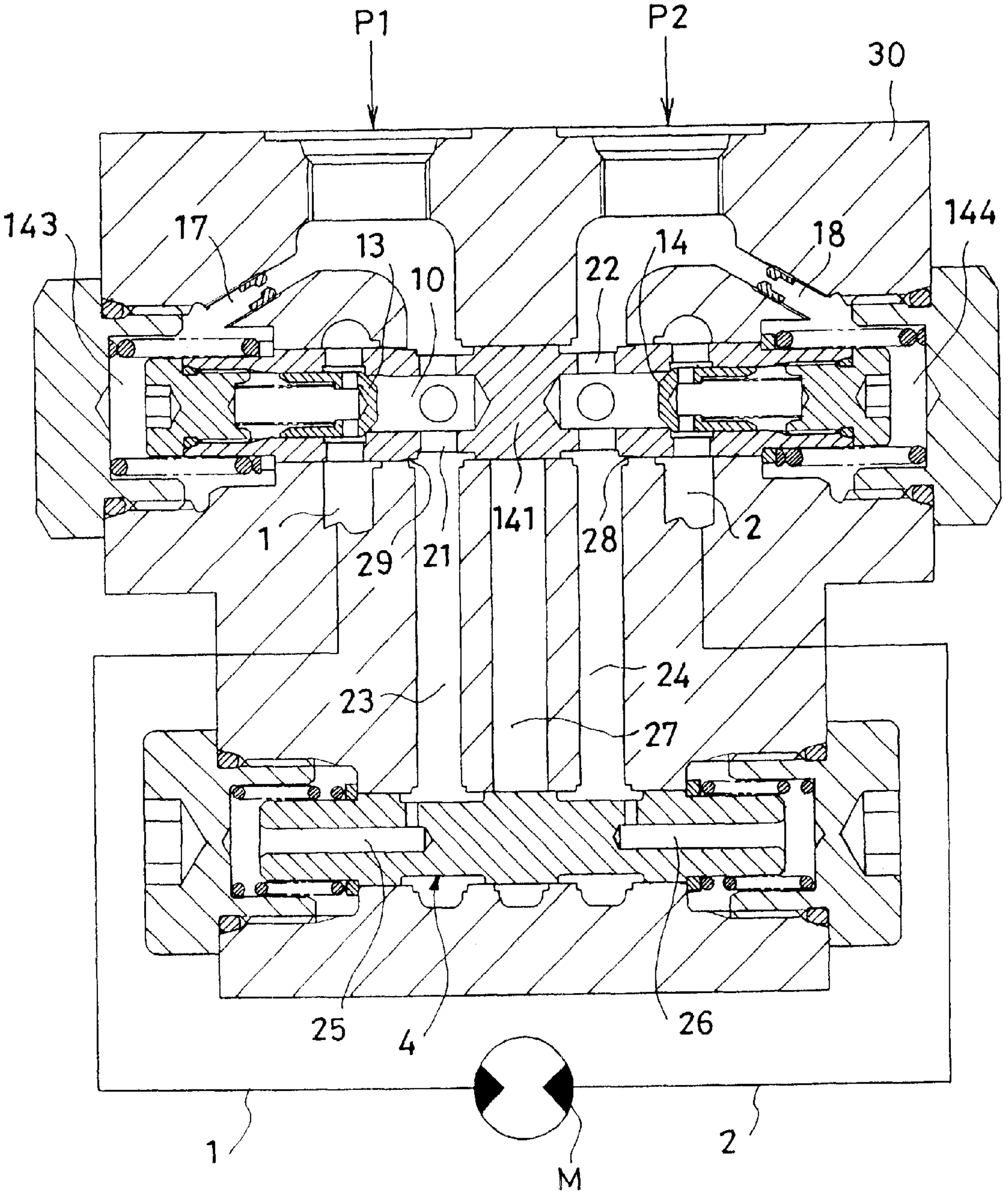
FIG. 13 is a front view in vertical section of a hydraulic drive unit according to a still further embodiment of the present invention.

FIG. 13 illustrates a hydraulic drive unit according to a still further embodiment of the present invention, which is not provided with a brake mechanism and hence not provided with the circuit 133 connected to the brake cylinder 105. Other structural points, a well as functions and effects, are the same as in the embodiment illustrated in FIG. 9.

Figure 14:
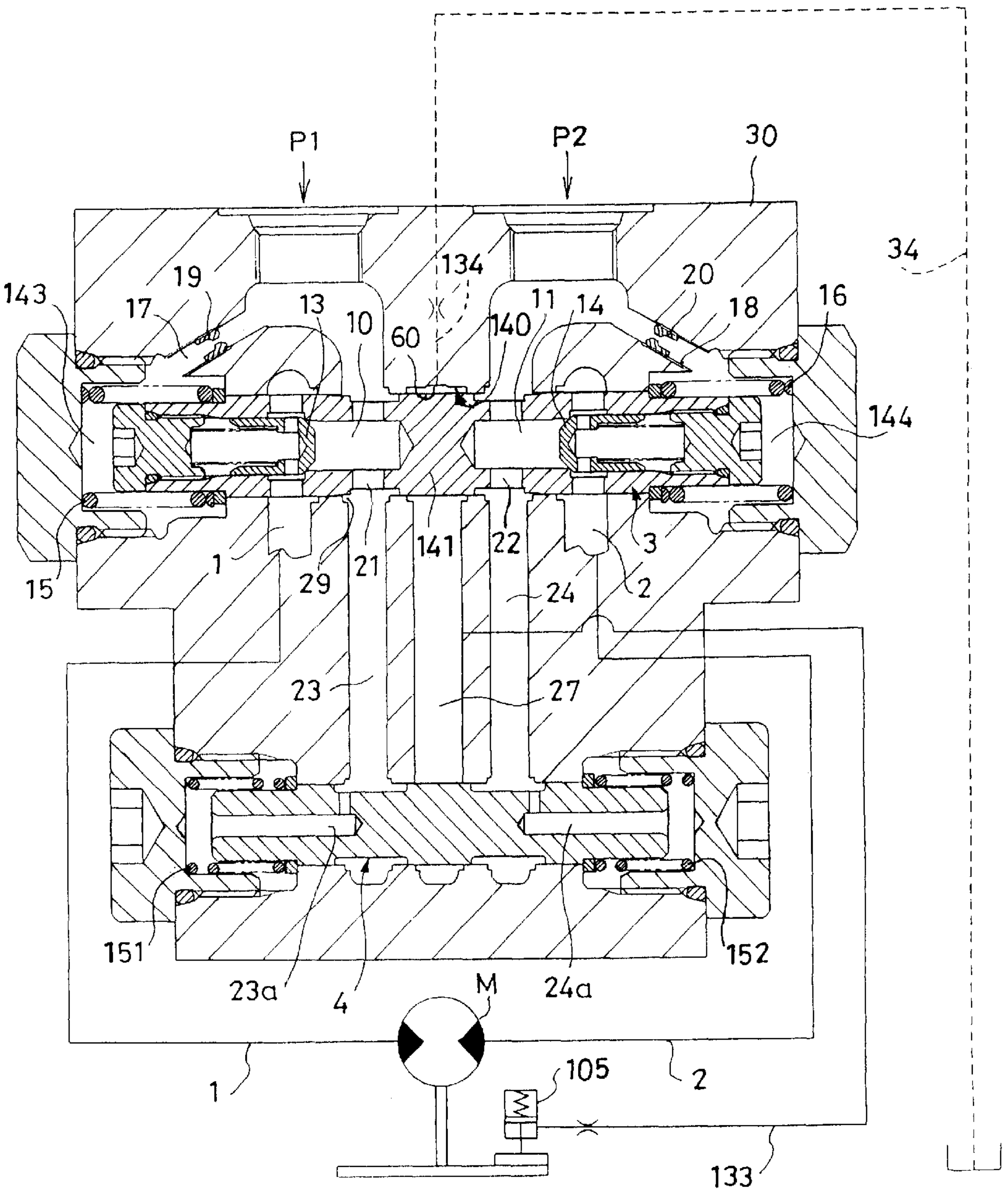
FIG. 14 is a front view in vertical section of a hydraulic drive unit according to a still further embodiment of the present invention.
Figure 15:
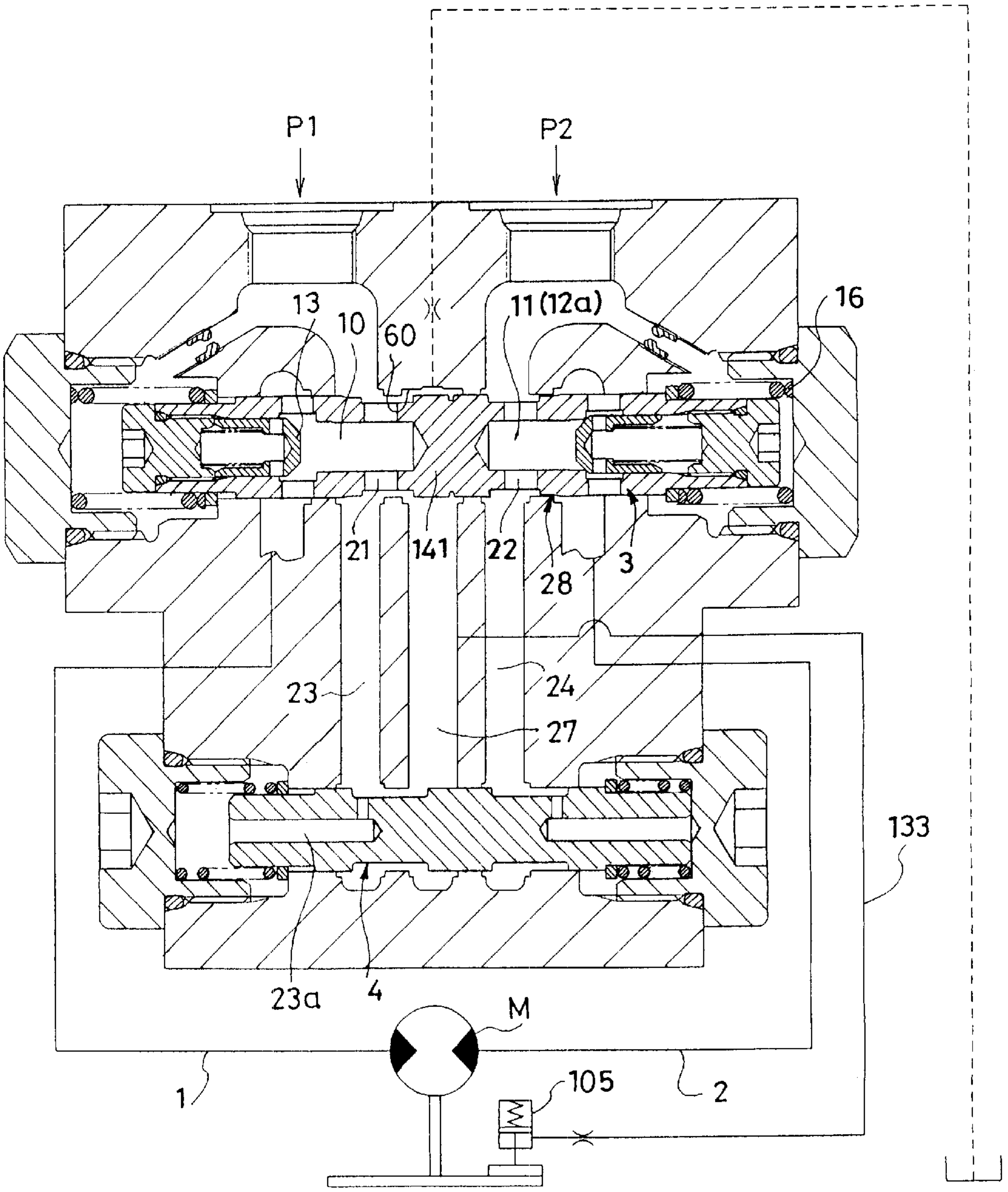
FIG. 15 is a front view in vertical section showing an operating state of the hydraulic drive unit illustrated in FIG. 14.
Figure 16:
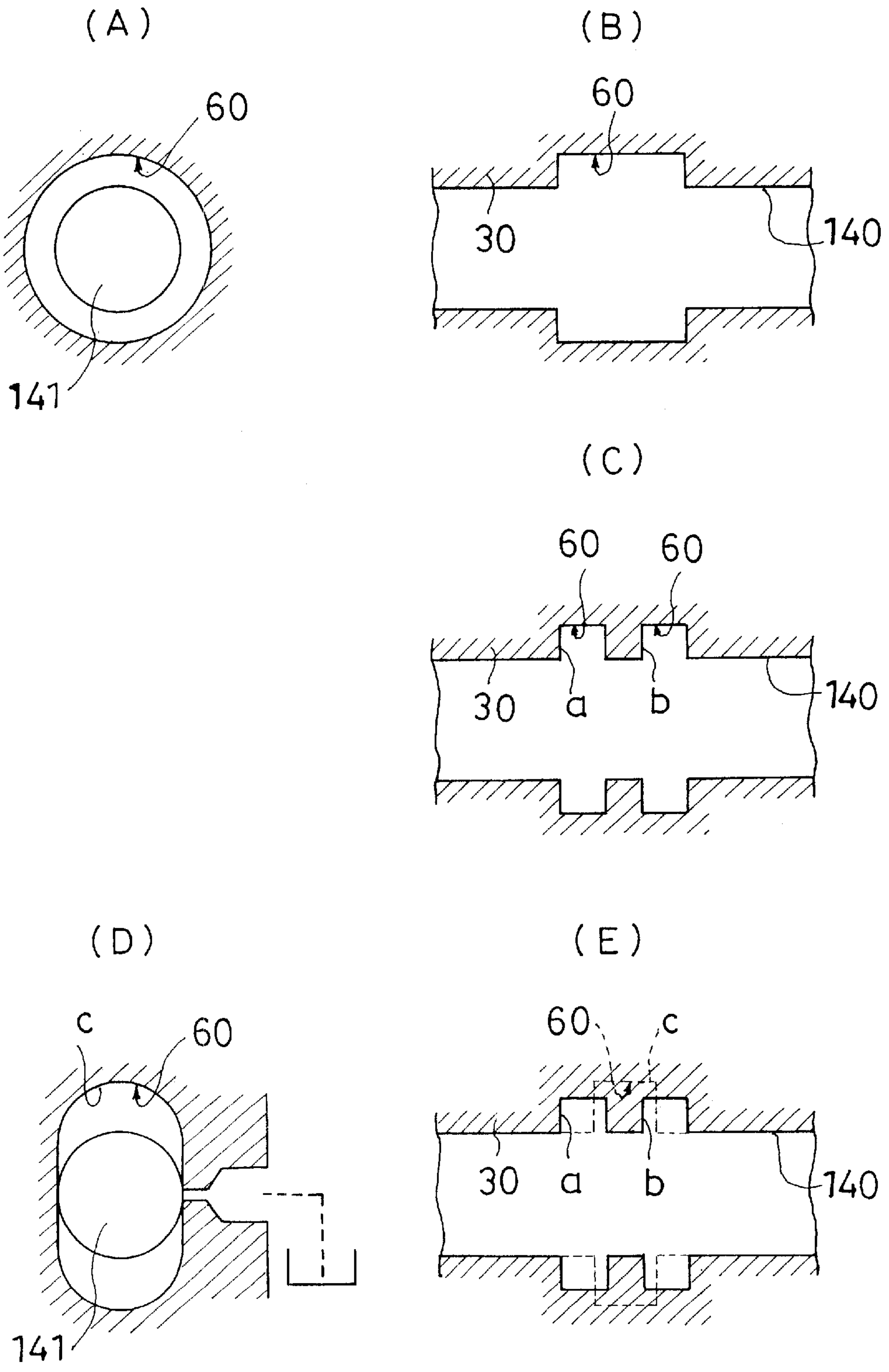
FIGS. 16(A), (B), (C), (D), and (E) are enlarged sectional views showing examples of land grooves.
Figure 17:
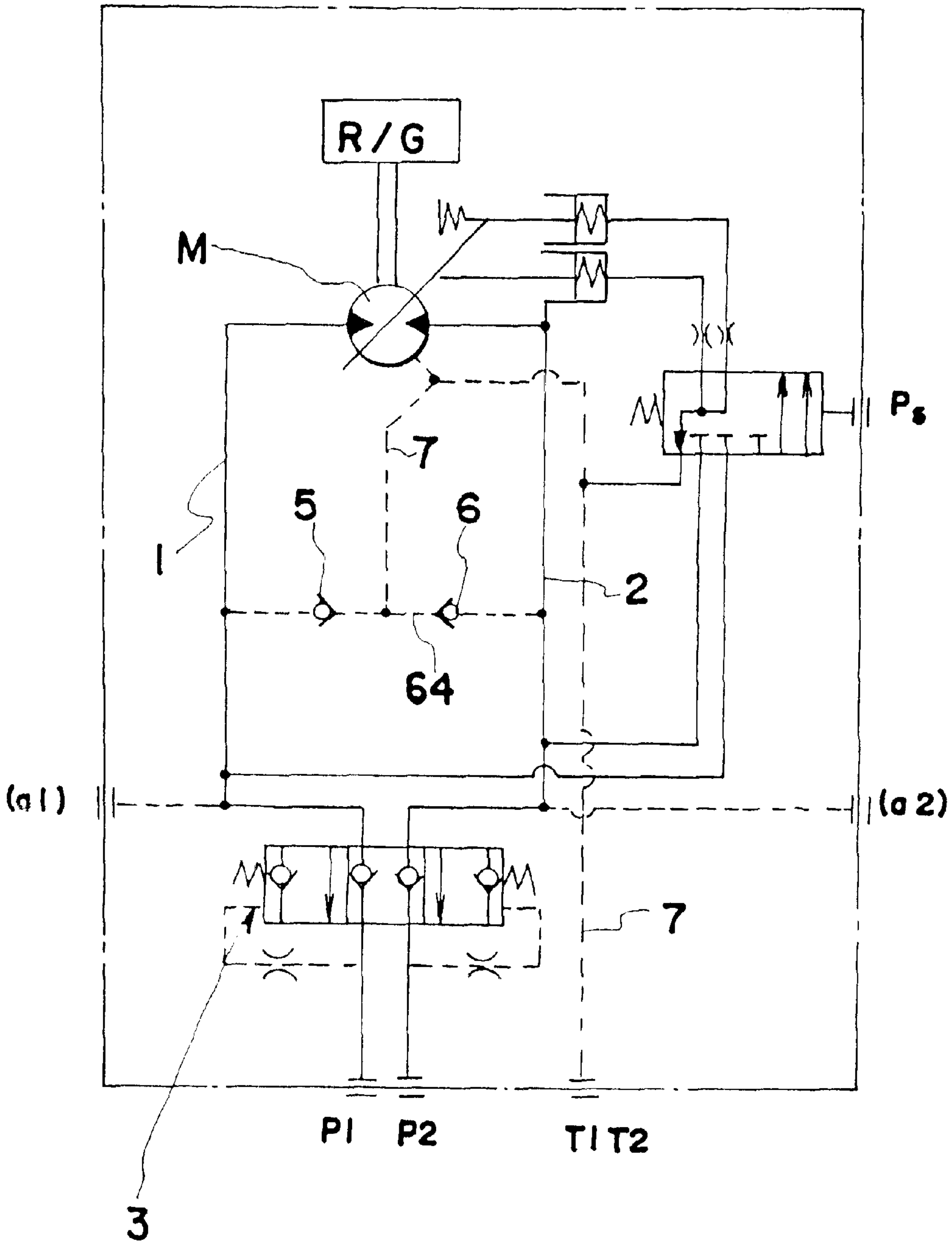
Fig.17 (PRIOR ART)
FIG. 17 is a conventional hydraulic circuit diagram.

FIGS. 14 to 16 illustrate a hydraulic drive unit according to a still further embodiment of the present invention.

This hydraulic drive unit is basically the same as the hydraulic drive unit illustrated in FIG. 10 and based on the hydraulic circuit of FIG. 9. A different point is that a land groove 60 is formed in the valve hole 140.

The structure and operation of this hydraulic drive unit will be described below, in which the same components as in FIG. 10 will be identified by the same reference numerals as in FIG. 10 and explanations thereof will be omitted.

Within a valve body 30 are formed pump ports P1 and P2 on an oil pressure source side and a pair of main circuits 1 and 2 which are connected to a hydraulic motor M. A valve hole 140 which communicates with the main circuits 1 and 2 perpendicularly thereto is formed in the valve body 30 and a valve body of a spool type counter-balancing valve 3 which changes over the main circuits 1 and 2 through opening and closing motions is inserted slidably into the valve hole 140. A land groove 60 having a suitable width is formed centrally in the inner periphery of the valve hole 140. When the valve body of the counter-balancing valve 3 is in a neutral state, the land groove 60 is closed with the valve body, while upon stroke of the valve body in one direction, the valve body becomes open in accordance with the stroke and a by-pass circuit 27 and a branch passage 21 or 22 come into communication with each other through the land groove 60.

All the other structural points are the same as in hydraulic drive unit illustrated in FIG. 10.

In the state of FIG. 14 the counter-balancing valve 3 is held in a neutral state, pressure oil is not fed, and the hydraulic motor M is blocked by first check valves 13 and 14 and is OFF. In this state, if the pump ports P1 and P2 are connected to the pump side and the tank side, respectively, pressure oil is fed to the main circuit 1. Consequently, a pilot pressure acts on a left-hand pressure chamber 143 through a pilot circuit 17, so that a spool 141 moves rightwards against a right-hand spring 16. In this state, a discharge passage 10 located on one side opens to the by-pass circuit 27 through the left-hand branch passage 21 and the land groove 60, while a return passage 12*a* located on the other right-hand side opens to the return-side main circuit 2 through the right-hand branch passage 22. In this case, between the right-hand branch passage 22 and the main circuit 2 there is formed a restriction 28 by the land of the spool 141.

When pressure oil is conducted into the left-hand discharge passage 10, the oil pressure thereof causes the left-hand first check valve 13 to open, allowing the pressure oil to be conducted to the main circuit 1 on the inflow side of the hydraulic motor M. The pressure oil in the main circuit 1 is also conducted to a pilot circuit 23*a* through a return circuit 23, causing a high pressure selection valve 4 to move rightwards to connect the by-pass circuit 27 to the return circuit 23. The pressure oil conducted to the by-pass circuit 27 is also conducted to a brake cylinder 105 through a circuit 133. Consequently, the hydraulic motor M rotates in the forward direction with the pressure oil in the main circuit 1 and the pressure oil returned from the hydraulic motor M is returned to the tank via the other man circuit 2—orifice 28—branch passage 22—return passage 12*a*—pump port P2.

For stopping the hydraulic motor M during the above operation, the pump ports P1 and P2 are cut off from the oil pressure source. In this case, however, in a certain time zone until complete return of the change-over valve to its neutral position for example, the spool 141 still occupies its right-hand position as in FIG. 15 though the spool 141 moves leftwards in degrees. With the gradual restricting of the orifice 28, the left-hand first check valve 13 located on the left-hand side is opened, allowing the hydraulic motor M to shift to an OFF state while slowing down. Once the hydraulic motor M begins to slow down, the pumping operation of the hydraulic motor M is performed, whereby one main circuit 1 is reduced its pressure, while the internal pressure of the other main circuit 2 becomes high in the presence of the orifice 28, thereby giving a braking force to the hydraulic motor M. The pressure oil passed through the orifice 28 acts on the right-hand side of the high pressure selection valve 4 from a return circuit 24 through a pilot circuit 24*a,* causing the valve 4 to move leftwards and connecting the return circuit 24 to the by-pass circuit 27. Consequently, as shown in FIG. 15, the pressure oil present in the main circuit 2 is circulated to the main circuit 1 via the return circuit 24—by-pass circuit 27—land groove 60—branch passage 21—discharge passage 10—first check valve 13 to prevent the internal pressure of the main circuit 1 from becoming negative and prevent the occurrence of cavitation. In this case through the land groove 60 the by-pass circuit 27 and the branch passage 21 are widely open and communicate with each other, allowing a large amount of the hydraulic actuating oil to flow and thereby preventing the oil flow from becoming deficient. After this state, the spool 141 moves toward its original position under the action of the right-hand spring 16 and is restored to its state shown in FIG. 14, whereby the hydraulic motor M is blocked completely and turns OFF.

FIG. 16 shows examples of the land groove 60.

A land groove shown in FIGS. 16(A) and (B) is an annular groove formed in the inner periphery of the valve hole 140 in the valve body 20 and having a suitable width in the longitudinal direction. It is substantially the same as that shown in FIG. 14.

A land groove shown in FIG. 16(C) comprises two or more annular grooves, a, b, formed spacedly from each other in the longitudinal direction.

A land groove 60 shown in FIGS. 16(D) and (E) comprises two annular grooves, a, b, and a lateral groove, c, which provides communication between the two annular grooves, a, b.

The land groove 60 is not specially limited insofar as it can provide communication in a large flow path area between the by-pass circuit 27 and the branch circuits 21, 22.

The following effects are attained by the present invention. (1) According to the inventions defined in the appended claims, when turning OFF the pump, the pressure oil in the return-side main circuit is circulated to the feed-side main circuit, so that sufficient pressure and flow rate are ensured, whereby the occurrence of cavitation caused by a negative pressure can be prevented and it is possible to improve the deceleration feeling of the hydraulic motor and prevent the occurrence of a noise. (2) The hydraulic drive unit according to the present invention is applicable to a traveling device in a small-sized construction machine without using a large circuit or modifying the internal structure of the system concerned for the replenishment of oil and is superior in machinability and assemblability because the counter-balancing valve is utilized as it is and only some by-pass circuits are provided.

What is claimed is:

1. A hydraulic drive unit comprising:

- a pair of main circuits (1), (2) each selectively connecting an oil pressure source with a hydraulic motor (M);
- a counter-balancing valve (3) disposed halfway of the main circuits (1), (2) so as to be capable of being changed over from one position to another, said counter-balancing valve (3) being provided with:
  - a pair of discharge passages (10), (11) and a pair of return passages (12*a*), (12*b*), both of which are adapted to be opened and closed for the main circuits (1), (2);
  - a pair of first check valves (13), (14), each disposed halfway of a respective one, of the discharge passages (10), (11);
  - a pair of orifices (28), (29) each selectively disposed halfway of a respective one of the return passages (12*a*), (12*b*); and
  - a pair of branch passages (21), (22), each connected to a respective one of the discharge passages (10), (11)

on upstream sides of the first check valves (13), (14) and selectively connected to a by-pass circuit(27);

return circuits (23), (24) each connected to a respective one of the main circuits (1), (2) and connected to each other;

a pair of second check valves (25), (26), each disposed halfway of a respective one of the return circuits (23), (24); and the pass circuit (27) connected to the return circuits (23), (24), where they are connected to each other.

2. A hydraulic drive unit according to claim 1, wherein the counter-balancing valve (3) consists of a spool type valve body inserted slidably into a valve hole (140) of a valve body (30), said valve hole (140) being provided with a land groove (60) having a suitable width which opens and closes the connection between the by-pass circuit (27) and the branch circuits (21), (22) in accordance with a stroke of the counter-balancing valve (3).

* * * * *